US012448841B2

(12) United States Patent
Lentine et al.

(10) Patent No.: US 12,448,841 B2
(45) Date of Patent: Oct. 21, 2025

(54) CLIMBING PRODUCT HAVING AN EXTENDABLE SECTION LOCK ASSEMBLY

(71) Applicant: Werner Co., Greenville, PA (US)

(72) Inventors: Tek Lentine, Aurora, IL (US); Thomas W. Parker, Jamestown, PA (US); David S. Pozgay, Wilmette, IL (US); Jackson W. Miller, Chicago, IL (US); Philip M. Anthony, III, Chicago, IL (US); Bryan E. Rolfs, Chicago, IL (US)

(73) Assignee: WERNER CO., Greenville, PA (US)

( * ) Notice: Subject to any disclaimer, the term of this patent is extended or adjusted under 35 U.S.C. 154(b) by 1120 days.

(21) Appl. No.: 17/387,846

(22) Filed: Jul. 28, 2021

(65) Prior Publication Data

US 2022/0034163 A1 Feb. 3, 2022

Related U.S. Application Data

(60) Provisional application No. 63/140,599, filed on Jan. 22, 2021, provisional application No. 63/058,805, filed on Jul. 30, 2020.

(51) Int. Cl.

*E06C 1/12* (2006.01)
*E06C 7/04* (2006.01)
*E06C 7/06* (2006.01)

(52) U.S. Cl.

CPC ................ *E06C 1/12* (2013.01); *E06C 1/125* (2013.01); *E06C 7/04* (2013.01); *E06C 7/06* (2013.01)

(58) Field of Classification Search

CPC ................. E06C 1/12; E06C 7/04; E06C 7/06
See application file for complete search history.

(56) References Cited

U.S. PATENT DOCUMENTS

| | | | | | | |
|---|---|---|---|---|---|---|
| 524,784 | A | * | 8/1894 | Monroe | E06C 1/12 | 182/209 |
| 2,680,555 | A | * | 6/1954 | Nilsson | E06C 7/06 | 182/211 |
| 2,900,041 | A | * | 8/1959 | Leavitt | E06C 1/10 | 403/324 |
| 3,464,522 | A | * | 9/1969 | Hyman | E06C 1/12 | 182/211 |
| 3,768,594 | A | * | 10/1973 | Kramer | E06C 7/06 | 182/210 |

(Continued)

FOREIGN PATENT DOCUMENTS

| | | |
|---|---|---|
| CN | 202125240 | 1/2012 |
| CN | 106837155 | 6/2017 |

(Continued)

*Primary Examiner* — Colleen M Chavchavadze

(74) *Attorney, Agent, or Firm* — Fitch, Even, Tabin & Flannery, LLP

(57) ABSTRACT

A climbing product whose sections are extendable having a base section and a fly section. The fly section in sliding engagement with the base section. The climbing product has a lock assembly having a lock fly portion directly attached to the fly section. The lock fly portion directly engages with the base section to lock the base section with the fly section. The lock fly portion has a plunger. The lock fly portion disengages from the base portion by moving the plunger. A method for using a ladder whose sections are extendable. A method for constructing a ladder whose sections are extendable.

20 Claims, 50 Drawing Sheets

(56) References Cited

U.S. PATENT DOCUMENTS

| | | | | |
|---|---|---|---|---|
| 4,226,302 | A * | 10/1980 | Roche | E06C 1/10<br>182/178.4 |
| 4,605,100 | A | 8/1986 | Inglese | |
| 4,754,843 | A | 7/1988 | Anderson | |
| 5,000,289 | A | 3/1991 | Sanchez, III | |
| 10,975,622 | B2 * | 4/2021 | Yoo | E06C 7/50 |
| 2015/0047927 | A1 * | 2/2015 | Nodarse | E06C 7/06<br>182/209 |
| 2016/0123079 | A1 | 5/2016 | Ballard | |
| 2020/0040656 | A1 | 2/2020 | Mora | |
| 2022/0034164 | A1 | 2/2022 | Lentine | |

FOREIGN PATENT DOCUMENTS

| | | |
|---|---|---|
| CN | 107075906 | 8/2017 |
| CN | 108386126 | 8/2018 |
| CN | 110792388 | 2/2020 |
| DE | 2412073 | 9/1975 |
| DE | 19507851 | 9/1995 |
| ES | 1070313 | 7/2009 |
| GB | 408298 | 4/1934 |
| GB | 1115672 | 5/1968 |
| JP | 2011163012 | 8/2011 |
| WO | 2019237077 | 12/2019 |

* cited by examiner

CLIMBING PRODUCT HAVING AN EXTENDABLE SECTION LOCK ASSEMBLY

CROSS-REFERENCE TO RELATED APPLICATIONS

This is a nonprovisional of U.S. provisional patent application Ser. No. 63/058,805 filed Jul. 30, 2020 and 63/140,599 filed Jan. 22, 2021, all of which are incorporated by reference herein.

FIELD OF THE INVENTION

The present invention pertains to a climbing product having an extendable section lock assembly. (As used herein, references to the "present invention" or "invention" relate to exemplary embodiments and not necessarily to every embodiment encompassed by the appended claims.) More specifically, the present invention pertains to a climbing product having an extendable section lock assembly where the lock assembly includes a fly lock portion attached to a fly section of the climbing product which locks with a base section of the climbing product, and which unlocks from the base section simply by the fly section being lifted relative to the base section.

BACKGROUND OF THE INVENTION

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

Current locking systems for extendable ladders and other devices with extendable sections require the user to perform a separate action to unlock the extendable sections prior to moving them. The performance of a separate action to unlock the extendable sections can be burdensome and introduce possible errors that could cause the extendable sections to move relative to each other in an undesired manner, resulting in damage or injury. It would be desirable to eliminate the need to perform a separate action to unlock the extendable sections prior to moving.

In addition, current locking systems on extension ladders are large and intrusive into a user's working space. It would be desirable to reduce or eliminate intrusion of a locking system into the user's working space.

BRIEF SUMMARY OF THE INVENTION

The present invention pertains to a climbing product whose sections are extendable. The climbing product comprises a base section having a first base rail and a second base rail in parallel and spaced relationship with the first base rail and base rungs attached to and between the first and second base rails. The climbing product comprises a fly section having a first fly rail and a second fly rail in parallel and spaced relationship with the first fly rail and fly rungs attached to and between the first and second fly rails. The fly section in sliding engagement with the base section. The climbing product comprises a lock assembly having a lock fly portion directly attached to the fly section. The lock fly portion directly engages with the base section to lock the base section with the fly section. The lock fly portion disengages from the lock base portion by simply moving the fly section relative to the base section to unlock the fly section from the base section.

The present invention pertains to a method for using a climbing product 10 whose sections are extendable. The method comprises the steps of sliding a fly section 20 of the climbing product 10 relative to a base section 12 of the climbing product 10 to which the fly section 20 is in sliding engagement. There is the step of locking the fly section 20 to the base section 12. There is the step of lifting the fly section 20 relative to the base section 12 to unlock the fly section 20 from the base section 12. There is the step of moving the fly section 20 down relative to the base section 12.

The present invention pertains to a method for producing a climbing product 10 whose sections are extendable. The method comprises the steps of attaching a lock assembly 28 having a lock fly portion 30 directly to a rung of a fly section 20 of the climbing product 10. There is the step of sliding the fly section 20 along a base section 12 of the climbing product 10 so the fly section 20 engages with the base section 12.

The present invention pertains to a climbing product whose sections are extendable. The climbing product comprises a base section having a first base rail and a second base rail in parallel and spaced relationship with the first base rail and base rungs attached to and between the first and second base rails. The climbing product comprises a fly section having a first fly rail and a second fly rail in parallel and spaced relationship with the first fly rail and fly rungs attached to and between the first and second fly rails. The fly section in sliding engagement with the base section. The climbing product comprises a lock assembly having a lock fly portion directly attached to the fly section. The lock fly portion directly engages with the base section to lock the base section with the fly section. The lock fly portion has a plunger. The lock fly portion disengages from the base portion by moving the plunger.

The present invention pertains to a method for using a ladder whose sections are extendable. The method comprises the steps of moving the ladder to a desired position. The ladder comprises a base section having a first base rail and a second base rail in parallel and spaced relationship with the first base rail and base rungs attached to and between the first and second base rails. The ladder comprises a fly section having a first fly rail and a second fly rail in parallel and spaced relationship with the first fly rail and fly rungs attached to and between the first and second fly rails. The fly section in sliding engagement with the base section the ladder comprises a lock assembly having a lock fly portion directly attached to the fly section. The lock fly portion directly engages with the base section to lock the base section with the fly section. The lock fly portion has a plunger. The lock fly portion disengages from the base portion by moving the plunger. There is the step of moving the plunger so the lock fly portion disengages from base portion. There is the step of sliding the fly section along the base section to extend the ladder to a desired length. There is the step of locking the fly section to the base section with the lock portion at the desired length.

The present invention pertains to a method for constructing a ladder whose sections are extendable. The method comprises the steps of attaching a lock fly portion of the lock assembly directly to a fly section of the ladder. The fly section having a first fly rail and a second fly rail in parallel and spaced relationship with the first fly rail and fly rungs attached to and between the first and second fly rails. The fly section in sliding engagement with the base section. The lock fly portion has a plunger. There is the step of attaching a lock base portion of the lock assembly directly attached to the base section. The lock fly portion directly engages with the lock base portion to lock the fly section to the base section. The lock fly portion disengages from the lock base portion by moving the plunger. The base section having a first base rail and a second base rail in parallel and spaced relationship with the first base rail and base rungs attached to and between the first and second base rails.

DETAILED DESCRIPTION OF THE INVENTION

Figure 1:
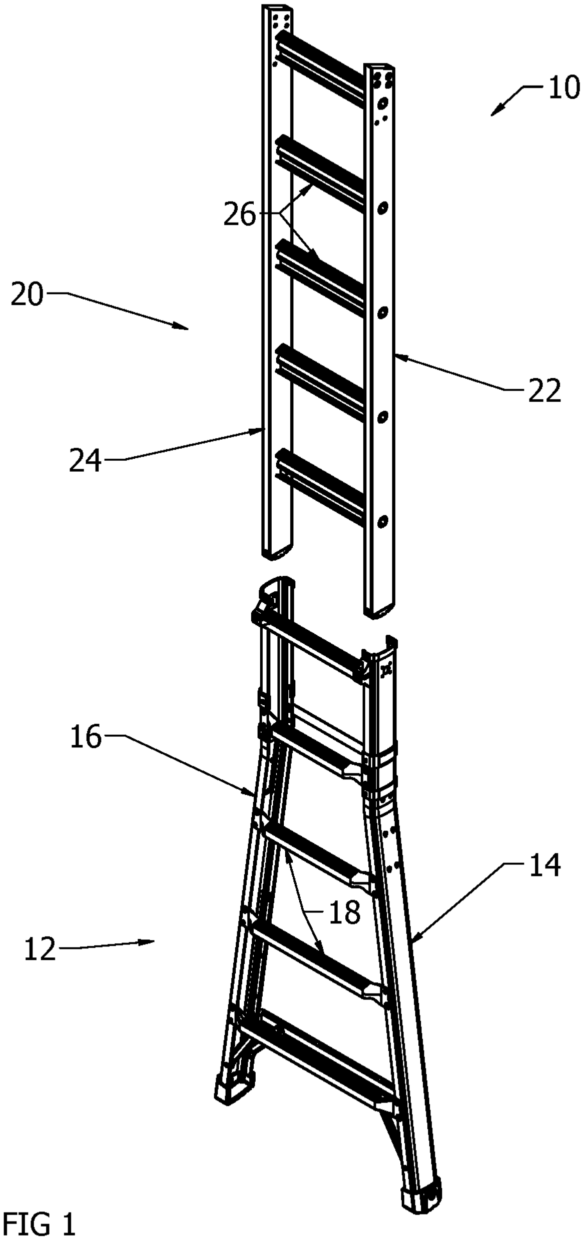
FIG. 1 shows two sections of an extendable ladder.
Figure 2:
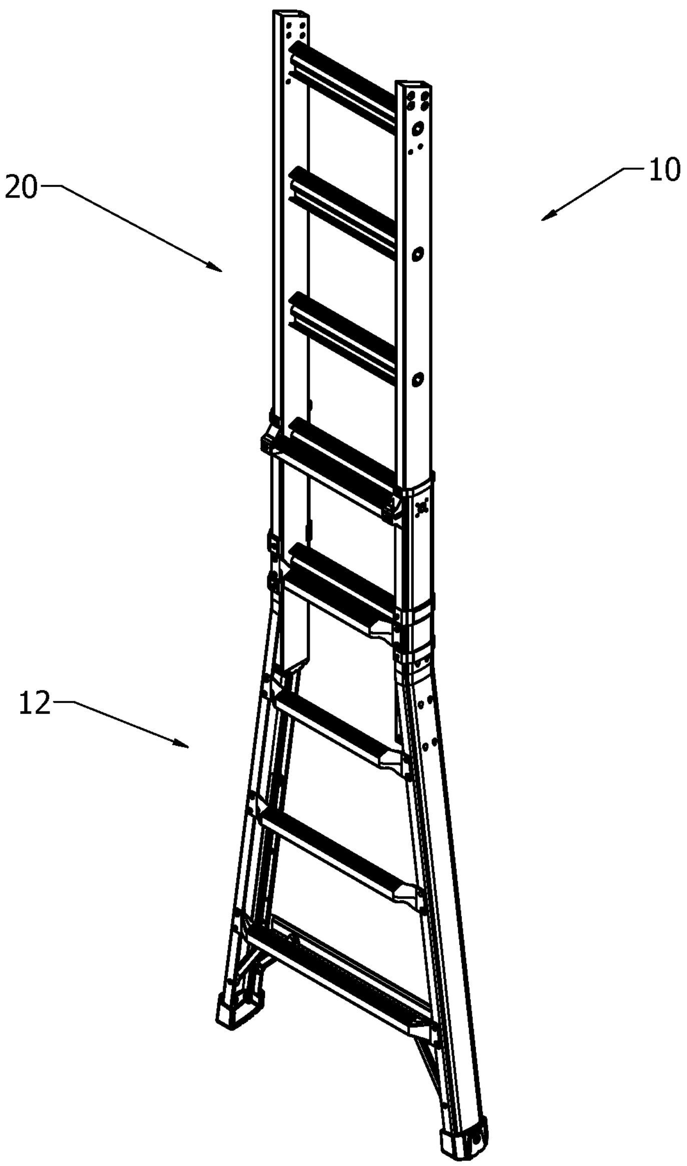
FIG. 2 shows the two sections assembled together with the moving section located within the rails of the fixed section in a typical MT ladder fashion.
Figure 3:
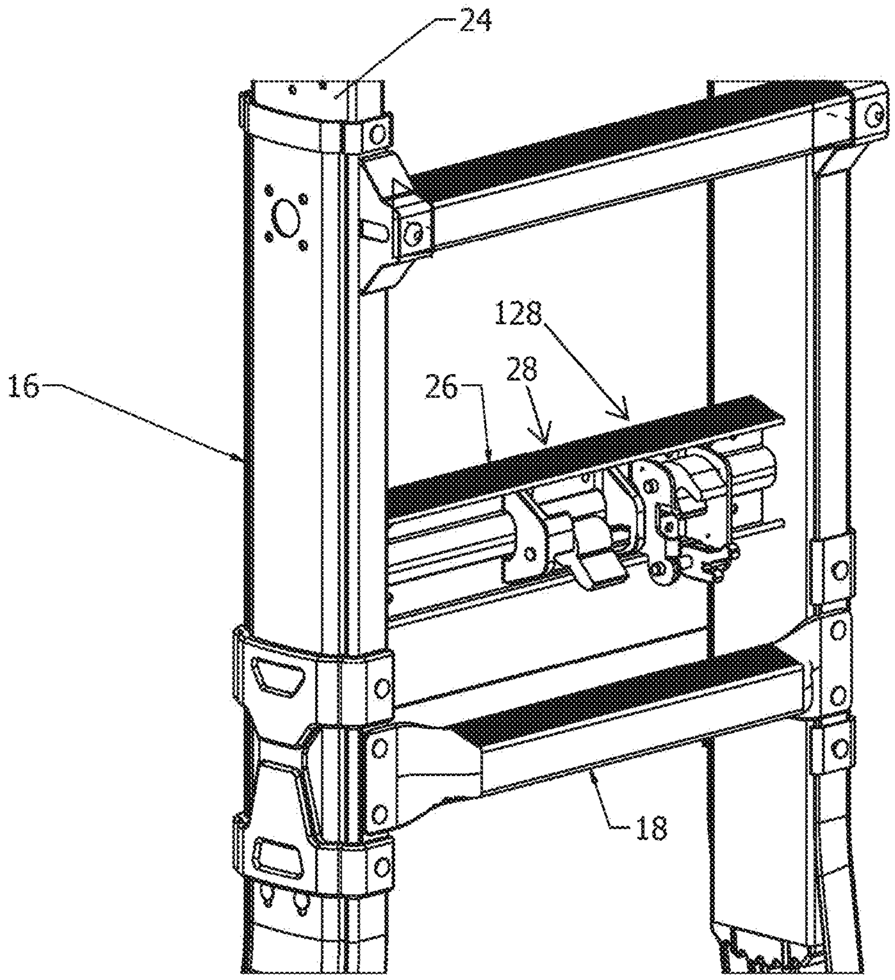
FIG. 3 shows two embodiments of the lock assembly of the present invention.

Referring now to the drawings wherein like reference numerals refer to similar or identical parts throughout the several views, and more specifically to FIGS. 1-3 thereof, there is shown a climbing product whose sections are extendable. The climbing product comprises a base section 12 having a first base rail 14 and a second base rail 16 in parallel and spaced relationship with the first base rail 14 and base rungs 18 attached to and between the first and second base rails 14, 16. The climbing product comprises a fly section 20 having a first fly rail 22 and a second fly rail 24 in parallel and spaced relationship with the first fly rail 22 and fly rungs 26 attached to and between the first and second fly rails 22, 24. The fly section 20 in sliding engagement with the base section 12. The climbing product comprises a lock assembly 28 having a lock fly portion 30 directly attached to the fly section 20. The lock fly portion 30 directly engages with the base section 12 to lock the base section 12 with the fly section 20. The lock fly portion 30 disengages from the lock base portion 32 by simply moving the fly section 20 relative to the base section 12 to unlock the fly section 20 from the base section 12. The climbing product 10 may include but not be limited to MT ladders, leaning ladders, and work platforms.

The lock assembly 28 may include a lock base portion 32 directly attached to the base section 12, as shown in FIGS. 3-10 and 18-21. The lock fly portion 30 directly engages with the lock base portion 32 to lock the fly section 20 to the base section 12. The lock fly portion 30 disengages from the lock base portion 32 by simply moving the fly section 20 relative to the base section 12 to unlock the fly section 20 from the base section 12. The lock base portion 32 may include a socket 34 disposed in one of the base rungs 18, and the lock fly portion 30 includes a flip lock 36 which fits into the socket 34 to lock the fly section 20 to the base section 12 so the fly section 20 cannot move downwards relative to the base section 12 when the fly section 20 is locked to the base section 12. The flip lock 36 disposed in one of the fly rungs 26. The flip lock 36 may have a stem 38 which fits into the socket 34 to lock the fly section 20 to the base section 12, an anchor 40 from which the stem 38 extends, a flip axle 42 extending through the anchor 40 about which the anchor 40 with the stem 38 rotates, and a flip spring 44 which biases the stem 38 into a stable position where the stem 38 extends essentially perpendicularly toward the first base rail 14 from the first fly rail 22.

The lock fly portion 30 may include a lock 46 which directly engages with one of the base rungs 18 to lock the fly section 20 to the base section 12 so the fly section 20 cannot move downwards relative to the base section 12 when the fly section 20 is locked to the base section 12. See FIGS. 11-17 and 22-25. The lock fly portion 30 disengages from the lock base portion 32 by simply moving the fly section 20 relative to the base section 12 to unlock the fly section 20 from the base section 12. The lock fly portion 30 may include a retractor 48 disposed adjacent the lock 46 which engages the lock 46 and maintains the lock 46 in a position out of the way of the base rungs 18 as the fly section 20 is moved downwards relative to the base section 12. The lock fly portion 30 may have a lock axle 50 extending through the lock 46 about which the lock 46 rotates and a retractor axle 54 extending through the retractor 48 about which the retractor 48 rotates. The lock 46 may have an anchor 40, a first arm 58 extending from the anchor 40 and a second arm 60 which is in spaced relation with the first arm 58, where the first arm 58 is longer than the second arm 60 and where the second arm 60 extends from the anchor 40. The first arm 58 and the second arm 60 and the anchor 40 together formed essentially a C shape and define a slot 62 between the first arm 58 and the second arm 60. The lock fly portion 30 may include a lock spring 64 which biases the lock 46 into a stable position where the first arm 58 and second arm 60 extend toward the first base rail 14. The lock fly portion 30 includes a retractor spring 66 which biases the retractor 48 into a stable position where the retractor 48 extends toward the first base rail 14.

The present invention pertains to a method for using a climbing product 10 whose sections are extendable. The method comprises the steps of sliding a fly section 20 of the climbing product 10 relative to a base section 12 of the climbing product 10 to which the fly section 20 is in sliding engagement. There is the step of locking the fly section 20 to the base section 12. There is the step of lifting the fly section 20 relative to the base section 12 to unlock the fly section 20 from the base section 12. There is the step of moving the fly section 20 down relative to the base section 12.

The present invention pertains to a method for producing a climbing product 10 whose sections are extendable. The method comprises the steps of attaching a lock assembly 28 having a lock fly portion 30 directly to a rung of a fly section 20 of the climbing product 10. There is the step of sliding the fly section 20 along a base section 12 of the climbing product 10 so the fly section 20 engages with the base section 12.

In the operation of the invention, the lock assembly 28 allows for extendable sections to be moved and locked without the need to reach a locking mechanism, such as when extending and retracting the top section of an MT ladder when set up in extension mode. Furthermore, the lock assembly 28 provides for reduced or eliminated intrusion into the user's working space by being positioned mostly in or under rungs of the climbing product 10.

FIG. 1 shows two sections of an extendable ladder. These sections could be half of an MT type ladder or a straight extendable ladder. The fixed section, such as a base section 12, rests on the ground while the moving section, such as a fly section 20, is adjustable for different heights.

FIG. 2 shows the two sections assembled together with the moving section located within the rails of the fixed section in a typical MT ladder fashion. It is desired that as the moving section is adjusted relative to the fixed section, it can be locked in various positions so that the rungs on the moving section are aligned with the rungs on the fixed section as shown.

The typical locks used on MT ladders are known as J-locks. The two J-locks must be manually unlocked one at a time, the moving section moved to the desired position, then the Mocks manually locked one at a time. J-locks are typically located at the upper end of the fixed section.

FIG. 3 shows two embodiments of the lock assembly 28 of the present invention. In FIG. 3, the embodiments are shown side by side attached to a rung of the moving section. In reality, only one embodiment would be mounted in the center of the rung.

Figure 4:
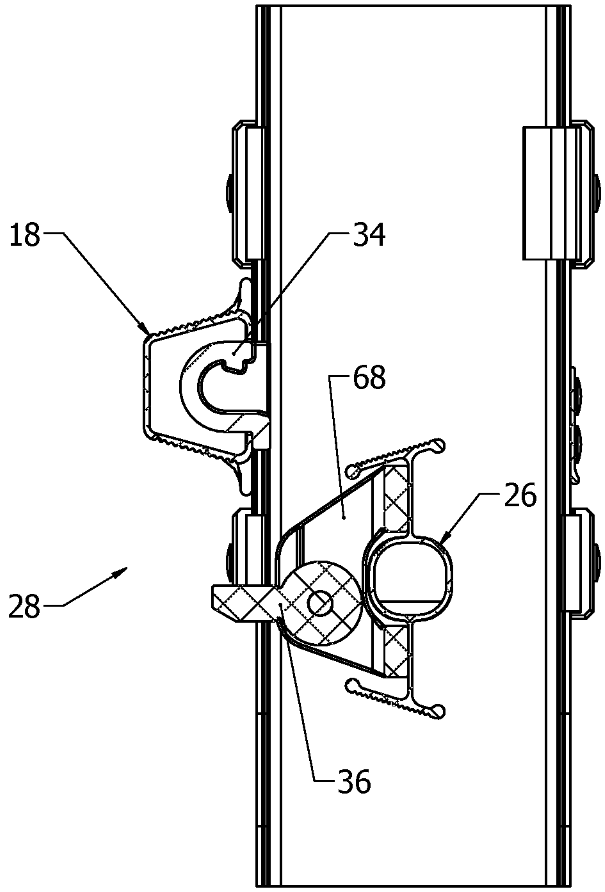
FIG. 4 shows a first embodiment of a flip lock with the flip lock in the position to which it returns when free.
Figure 5:
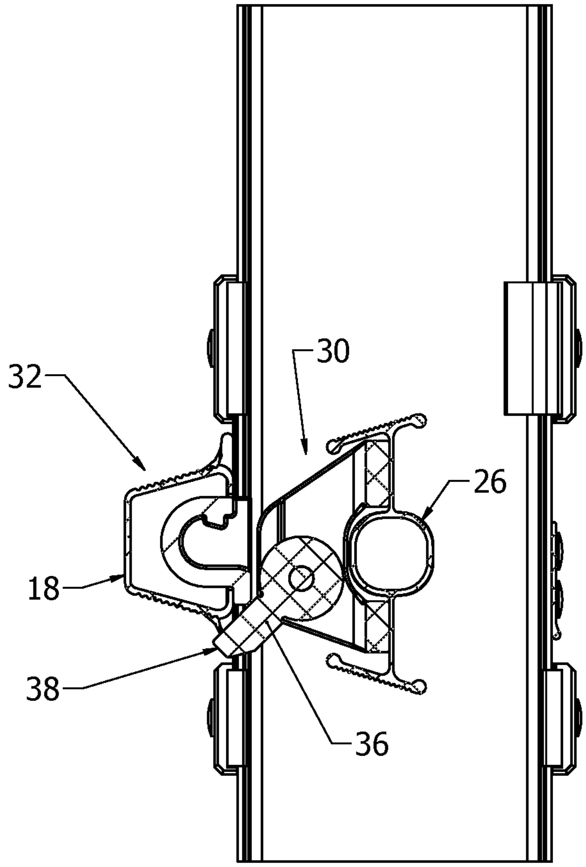
FIG. 5 shows the flip lock is deflected as the base rung and fly rung begin to pass each other.
Figure 6:
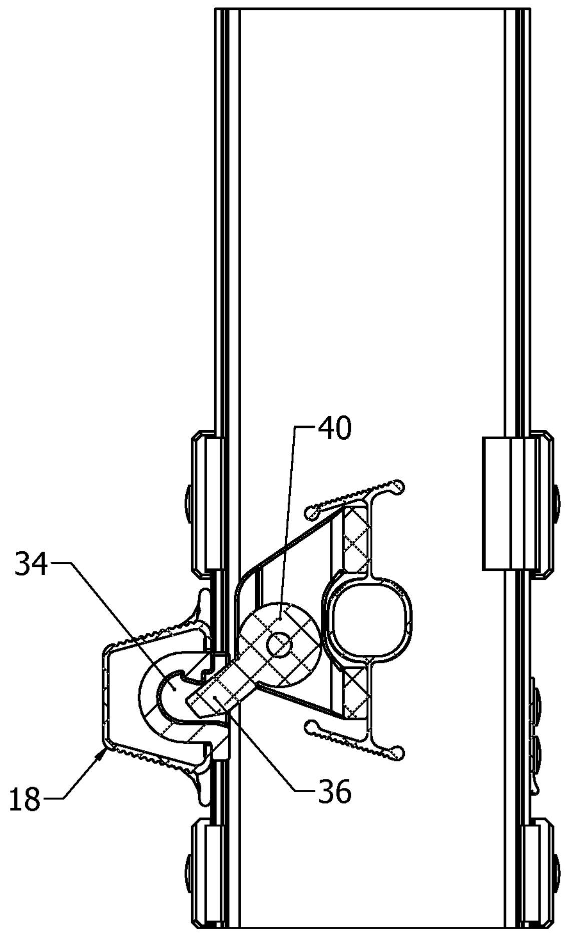
FIG. 6 shows the flip lock as it enters a socket.
Figure 7:
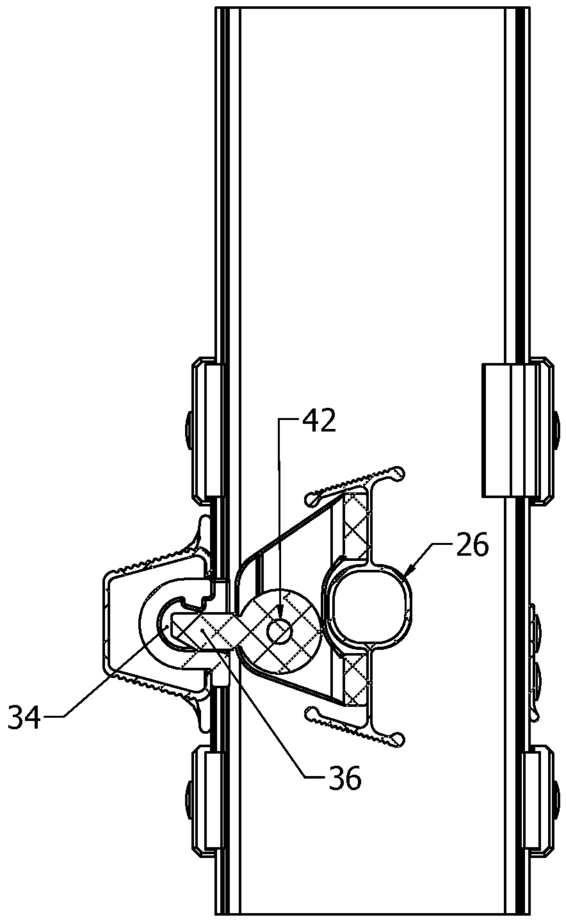
FIG. 7 shows the flip lock wedged in the socket, which prevents the fly rung from further descending.
Figure 8:
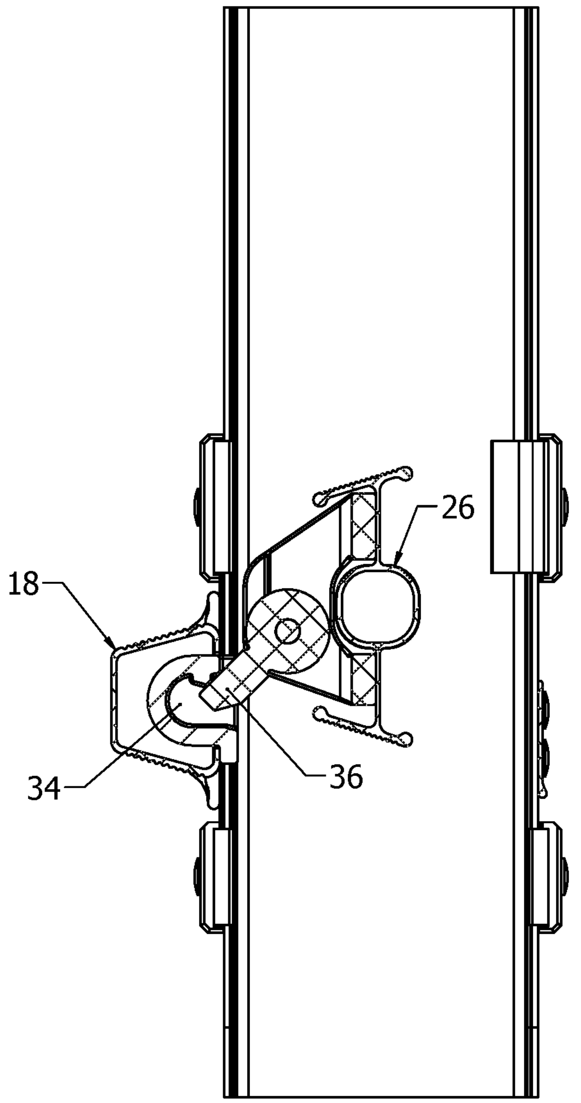
FIG. 8 shows raising the fly rung withdraws the flip lock from engagement with the socket.
Figure 9:
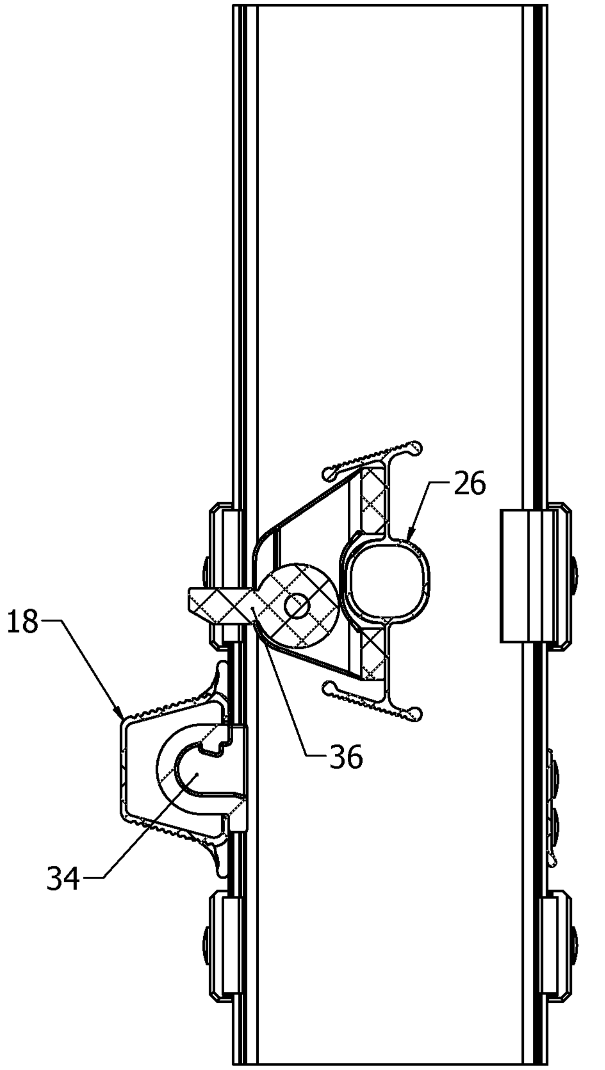
FIG. 9 shows the flip lock is returned to its spring-biased position after it has cleared the base rung.
Figure 10:
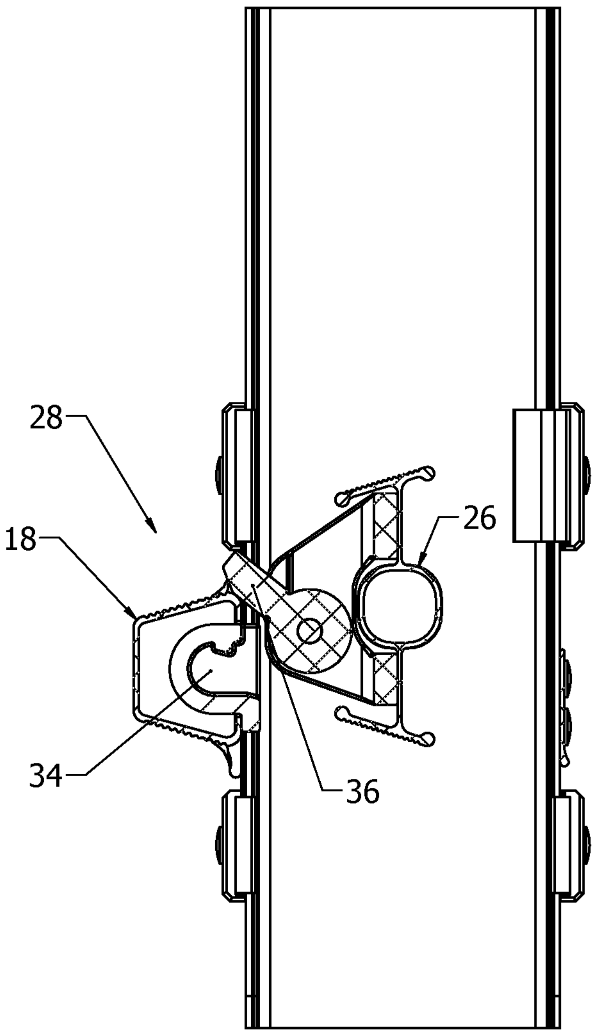
FIG. 10 shows the flip lock deflects from the base rung to allow the fly rung to freely descend.

FIGS. 4-10 show the operation of the first embodiment. A socket 34 is mounted within each of the fixed (base) section rungs. A flip lock 36 is attached to one rung of the moving section. FIG. 4 shows the flip lock 36 in the position to which it returns when free. FIG. 5 shows the flip lock 36 is deflected as the base rung and fly rung begin to pass each other. FIG. 6 shows the flip lock 36 as it enters a socket 34. FIG. 7 shows the flip lock 36 wedged in the socket 34, which prevents the fly rung from further descending. FIG. 8 shows raising the fly rung withdraws the flip lock 36 from engagement with the socket 34. FIG. 9 shows the flip lock 36 is returned to its spring-biased position after it has cleared the base rung. FIG. 10 shows the flip lock 36 deflects from the base rung to allow the fly rung to freely descend.

A flip lock 36 is attached to one rung of the moving section. The flip lock 36 can be pivoted up or down but is biased by spring force to return to the position seen in FIG. 4 when free. Raising the moving section upward allows the stem 38 of the flip lock 36 to enter the socket 34. At that point, lowering the moving section causes the stem 38 of the flip lock 36 to wedge into the socket 34 (FIGS. 5-7). In this condition, the moving section is prevented from moving downward relative to the fixed section because the size and the shape of the socket 34 prevents the stem 38 from moving in the socket 34. To unlock the moving section, it is raised until the flip lock 36 is above the fixed section rung (FIGS. 8 and 9). At this point, the moving section can be lowered (FIG. 10) as far as desired. It should be noted that when the stem 38 is moving down from above the fixed section rung, the stem 38 is cammed upwards by the fixed section rung as the step moves downward past the fixed section rung, so the stem 38 slides by the socket 34 and does not enter the socket 34. It is only when the stem 38 is moving upwards, and it clears the lower portion of the fixed section rung and is forced under the action of the flip spring 44 back to its stable position can it enter into the socket 34 so that when the stem 38 is now in the socket 34 and the moving section is then lowered, does the stem 38 wedge into the socket 34. The upper end of the stem 38, at the bottom is angled inwards to facilitate the movement of the stem 38 out of the socket 34 when the moving section is lifted. The shape of the socket 34 is essentially flat along the top of the socket 34 so the stem 38 has essentially no place to move to come out of the socket 34 when a downward force is applied to the stem 38, thus locking the fixed section and the moving section, while the rear of the socket 34 is more rounded to allow the upper and of the stem 38 clearance to come out of the socket 34 when the moving section is lifted.

FIGS. 11-17 show the operation of the second embodiment of the lock assembly 128.

Figure 11:
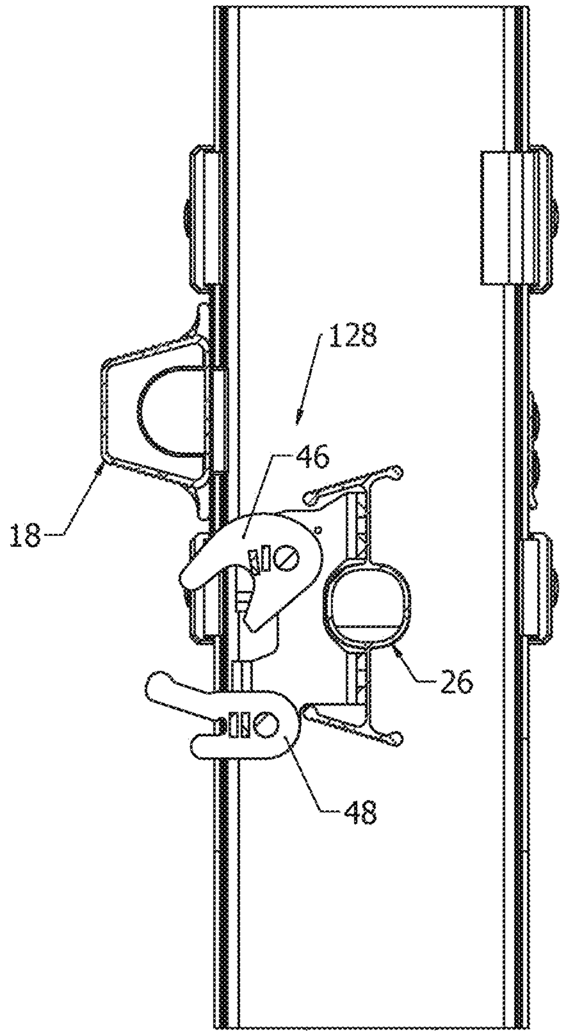
FIG. 11 shows a second embodiment of a flip lock with the lock and the retractor in the position to which they are spring biased when free of any base rung.
Figure 12:
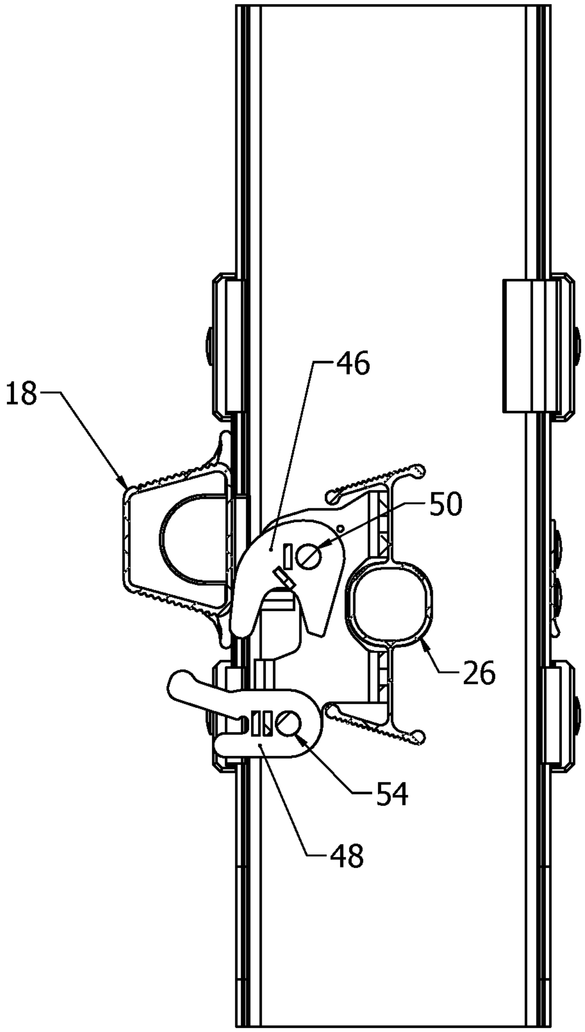
FIG. 12 shows the lock is deflected by the base rung as the fly rung is lifted.
Figure 13:
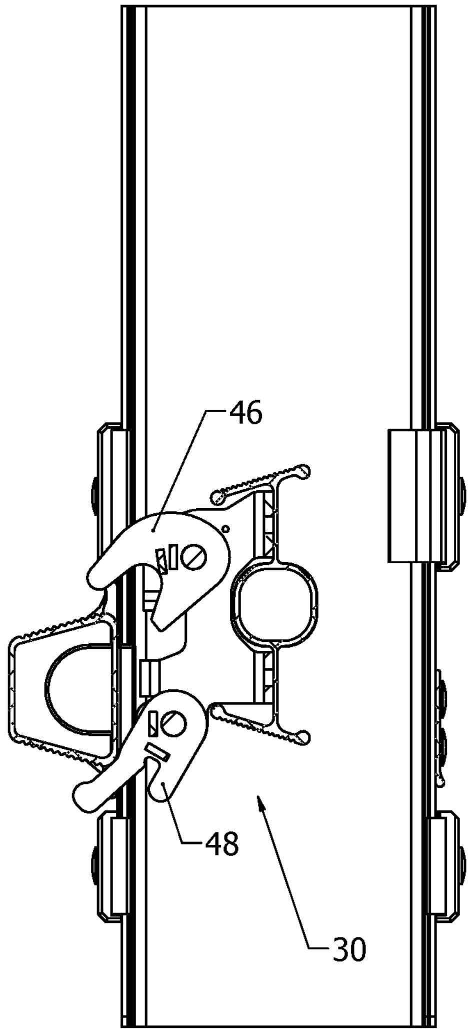
FIG. 13 shows the lock has cleared the base rung in the retractor has been partially deflected by the base rung.
Figure 14:
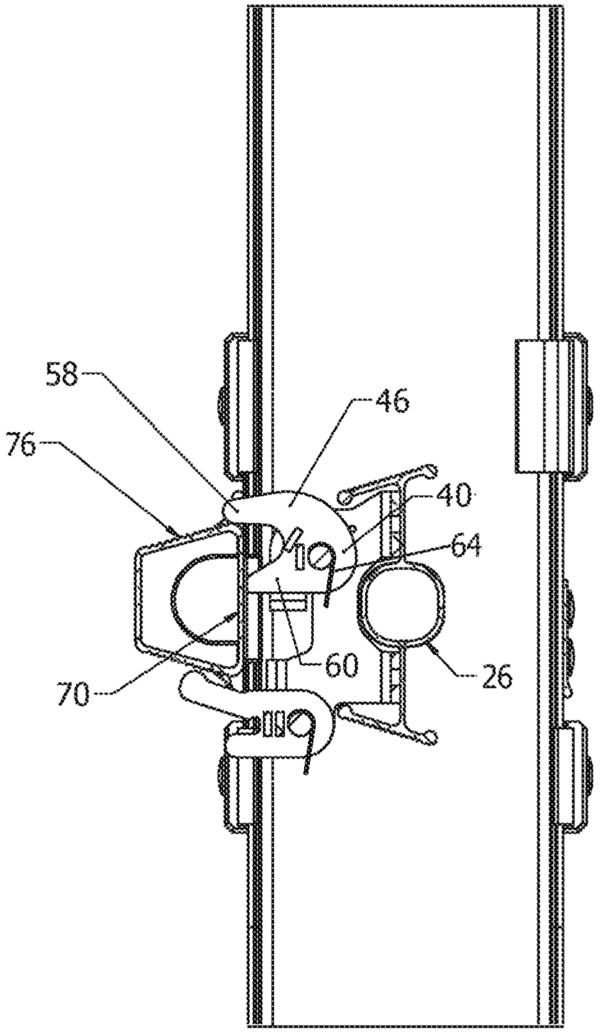
FIG. 14 shows the lock has engaged the base rung to prevent further motion downward as the fly rung has been moved down and the retractor is clear of the base rung.
Figure 15:
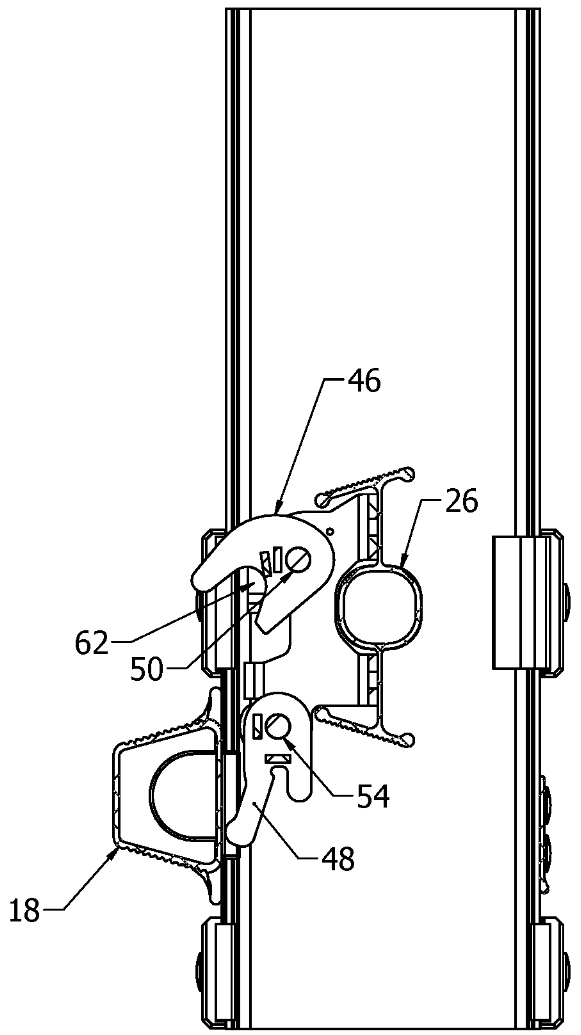
FIG. 15 shows the retractor is deflected by the base rung as the fly rung is lifted and the lock is clear of the base rung.
Figure 16:
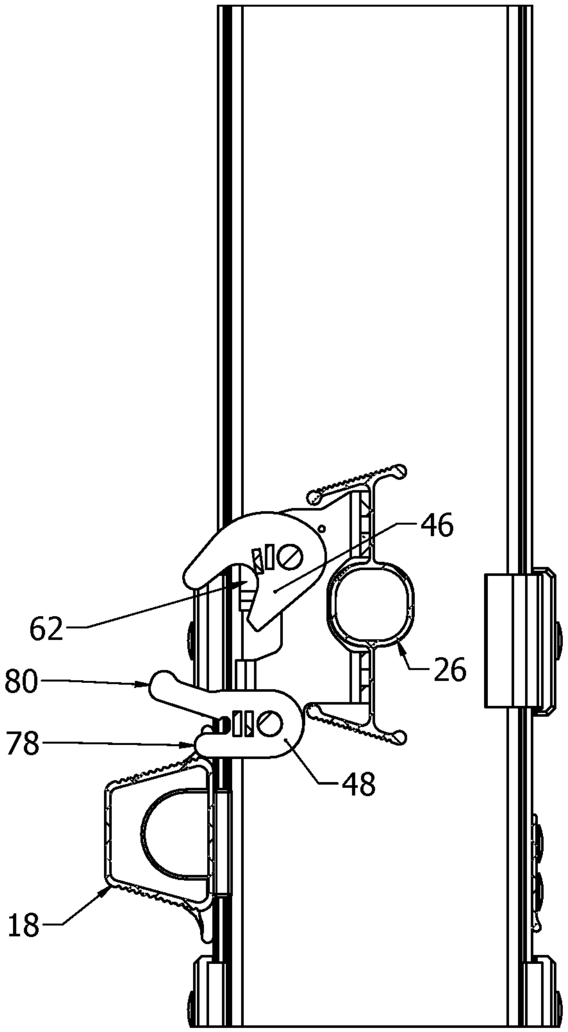
FIG. 16 shows both the lock and the retractor are free and clear of the base rung as the fly rung has been lifted past the base rung.
Figure 17:
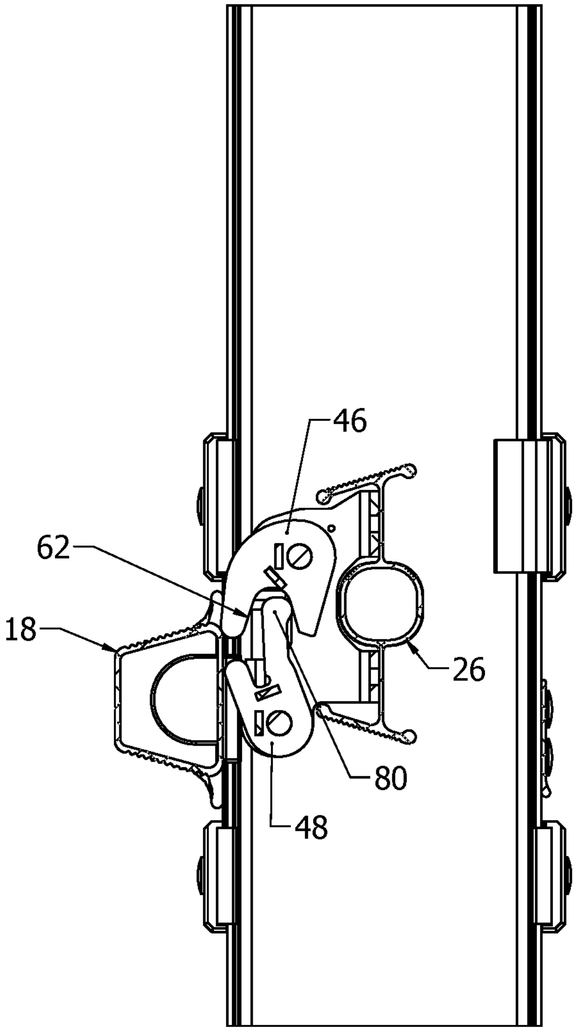
FIG. 17 shows the retractor has fitted into the slot of the lock because the base rung has deflected the retractor as the fly rung is moved down, thus allowing the fly rung to the sender freely.

FIG. 11 shows the lock 46 and the retractor 48 in the position to which they are spring biased when free of any base rung 18. FIG. 12 shows the lock 46 is deflected by the base rung 18 as the fly rung 26 is lifted. FIG. 13 shows the lock 46 has cleared the base rung 18 and the retractor 48 has been partially deflected by the base rung 18. FIG. 14 shows the lock 46 has engaged the base rung 18 to prevent further motion downward as the fly rung 26 has been moved down and the retractor 48 is clear of the base rung 26. FIG. 15 shows the retractor 48 is deflected by the base rung 18 as the fly rung 26 is lifted and the lock 46 is clear of the base rung 18. FIG. 16 shows both the lock 46 and the retractor 48 are free and clear of the base rung 18 as the fly rung 26 has been lifted past the base rung 18. FIG. 17 shows the retractor 48 has fitted into the slot 62 of the lock 46 because the base rung 18 has deflected the retractor 48 as the fly rung 26 is moved down, thus allowing the fly rung 26 to descend freely.

A lock 46 and a retractor 48 of the lock assembly 128 are attached to one rung 26 of the moving section 20. Both lock 46 and retractor 48 can be pivoted up and down but are biased by spring forces to return to the positions seen in FIG. 11. FIGS. 12-14 show the locking sequence which is very similar to the locking assembly 28 of the first embodiment. A difference is that when the moving section 20 is locked (FIG. 14), the lock 46 is braced against the top rear of the fixed section rung 18 by the first arm 58 of the lock 46 extending over the fixed section rung 18 and contacting the top flange 76 of the fixed section rung 18 and the second arm 60 of the lock 46 contacting and pressing against the web 70 of the fixed section rung 18, so this embodiment does not require a socket 34. In this condition, the moving section 20 is prevented from moving downward relative to the fixed section 12 because the lock 46 has nowhere to move with respect to a downward force. To unlock the moving section 20, it is raised until both the lock 46 and retractor 48 are above the fixed section rung 18 (FIG. 16). Then as the moving section 20 is lowered, the first retractor arm 78 of the retractor 48 is cammed upward by the fixed section rung 18 it is moving past, causing the second retractor arm 80 to fit into the slot 62 of the lock 46, which is now free and clear from any fixed section rung 18, and retracts the lock 46 so that the moving section 20 can be lowered (FIG. 17) as far as desired. Once the lowering of the moving section 20 has stopped, under the action of the retractor spring 66 and the lock spring 64 of the retractor 48 and the lock 46, respectively, the retractor 48 and the lock 46 will return to their stable positions as long as there is no fixed section rung 18 blocking them.

Figure 18:
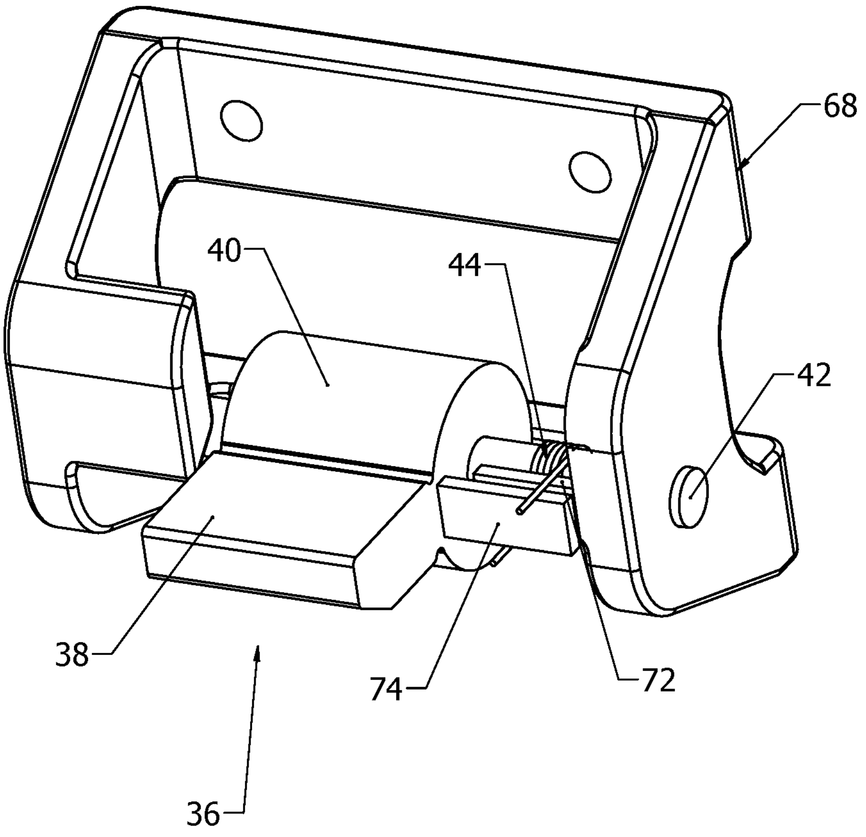
FIG. 18 shows further details of the lock assembly for the first embodiment.
Figure 20:
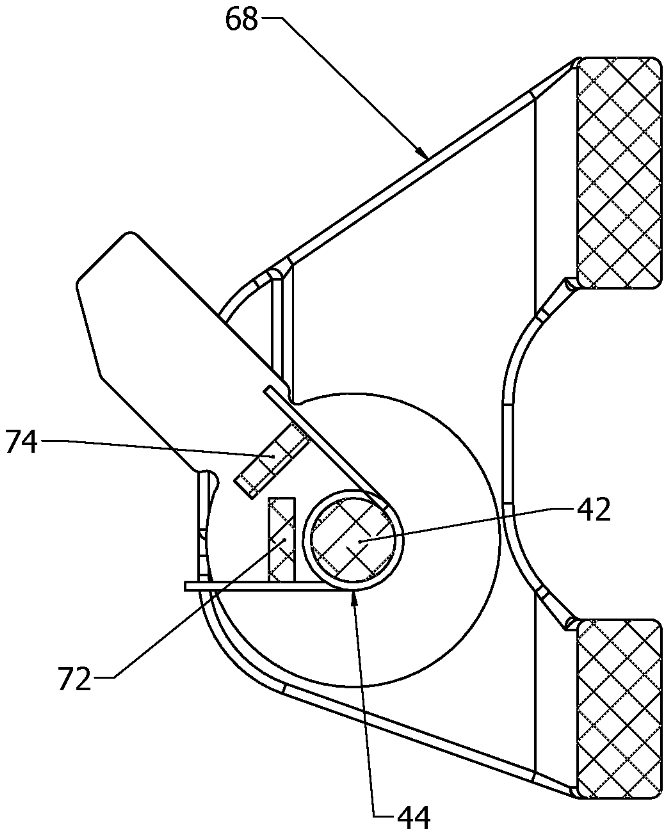
FIG. 20 is a cross-sectional side view of the flip lock when it has been deflected upwards by a base rung.
Figure 21:
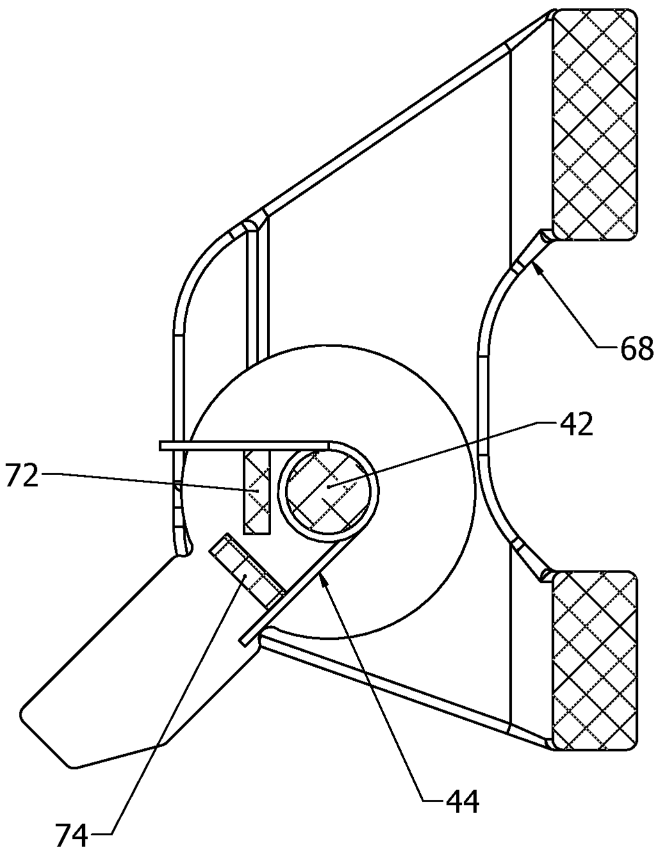
FIG. 21 is a cross-sectional side view of the flip lock when it has been deflected downwards by a base rung.

FIG. 18 shows the lock assembly 28 for the first embodiment. There is a frame 68 that is riveted or bolted to the desired rung 26 of the moving section 20. The flip axle 42 is mounted to the frame 68 and the flip lock 36 is mounted to the flip axle 42. There is a flip spring 44 positioned about the flip axle 42 with a top end and a bottom end of the flip spring 44 extending outwards. Between the top end and the bottom end of the flip spring 44 is a flip lock stop 74 extending from the flip lock 36 and a frame stop 72 extending from the frame 68. The flip lock stop 74 and the frame stop 72 bias the respective spring as they move, as shown in FIGS. 19-21.

Figure 19:
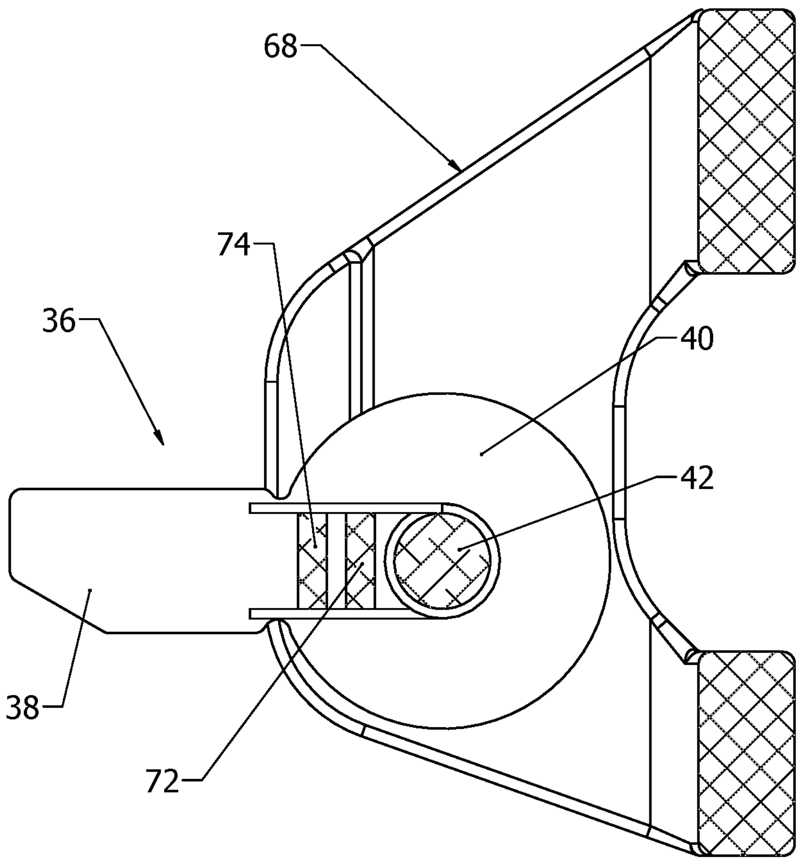
FIG. 19 a cross-sectional side view showing the flip lock stop and the frame stop and the flip lock when the flip lock is free and clear of any base rung.

FIG. 19 a cross-sectional side view showing the flip lock stop 74 and the frame stop 72 and the flip lock 36 when the flip lock 36 is free and clear of any base rung 18. FIG. 20 is a cross-sectional side view of the flip lock 36 when it has been deflected upwards by a base rung 18. The flip lock stop 74 has pushed against the top of the flip spring 44 and the frame stop 72 has maintained the bottom of the flip spring 44 in position, thus causing a biasing force by the top of the spring pushing downwards against the flip lock stop 74. FIG. 21 is a cross-sectional side view of the flip lock 36 when it has been deflected downwards by a base rung 18. The flip lock stop 74 has pushed against the bottom of the flip spring 44 and the frame stop 72 has maintained the top of the flip spring 44 in position, thus causing a biasing force by the bottom of the spring upwards against the flip lock 36.

Figure 22:
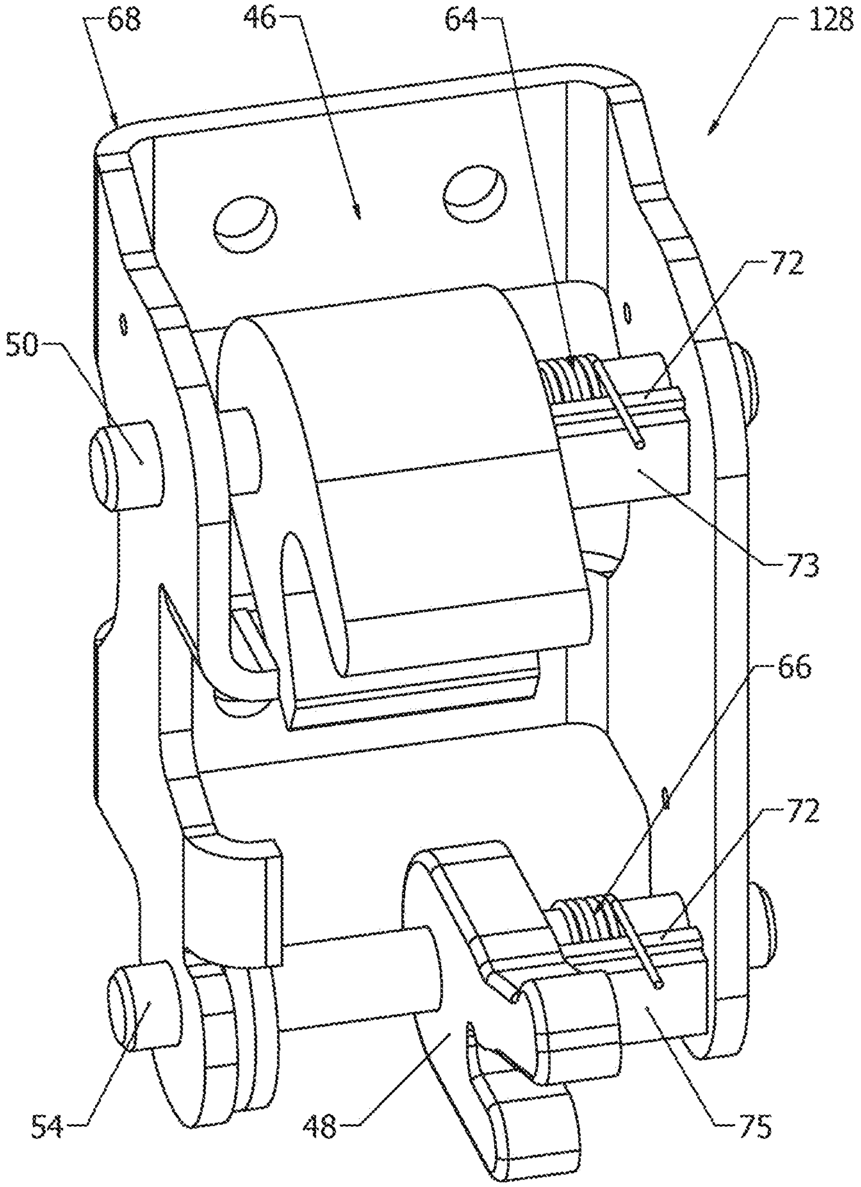
FIG. 22 shows the lock assembly of the second embodiment.

FIG. 22 shows the lock assembly 128 of the second embodiment. There is a frame 68 that is riveted or bolted to the desired rung 26 of the moving section 20. There is a lock axle 50 having the lock 46 mounted to the frame 68 and a retractor axle 54 having the retractor 48 mounted to the frame 68. There is a lock spring 64 positioned about the lock axle 50 and a retractor spring 66 positioned about the retractor axle 54. Between the top end and the bottom end of the lock spring 64 is a lock stop 73 and a frame stop 72, and between the top end and the bottom end of the retractor spring 66 is a retractor stop 75 and another frame stop 72.

Figure 23:
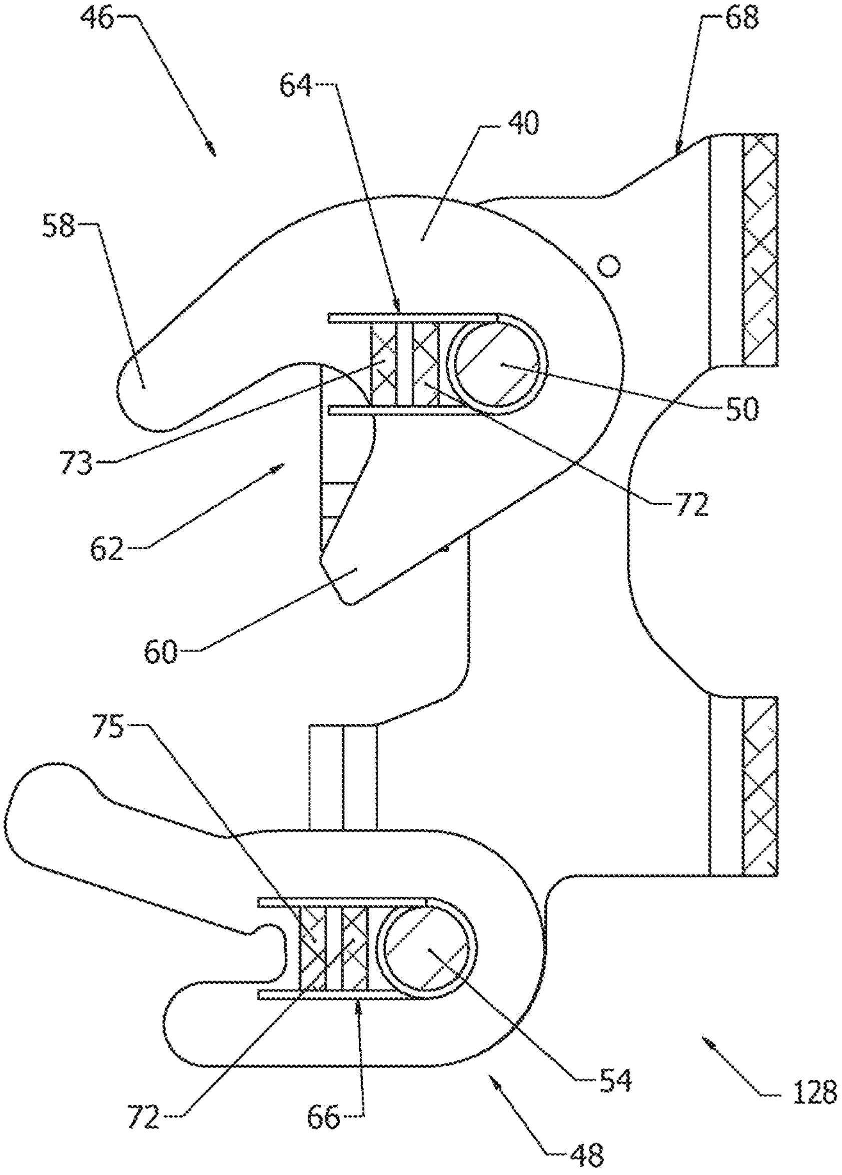
FIG. 23 is a cross-sectional side view of the lock in the retractor and the frame stops and the lock stop and the retractor stop when the lock and the retractor are free and clear of any base rung.

The frame stops 72 and the lock stop 73 and the retractor stop 75 bias the respective springs as they move, as shown in FIGS. 22-25. FIG. 23 is a cross-sectional side view of the lock 46 and the retractor 48 and the frame stops 72 and the lock stop 73 and the retractor stop 75 when the lock 46 and the retractor 48 are free and clear of any base rung 18.

Figure 24:
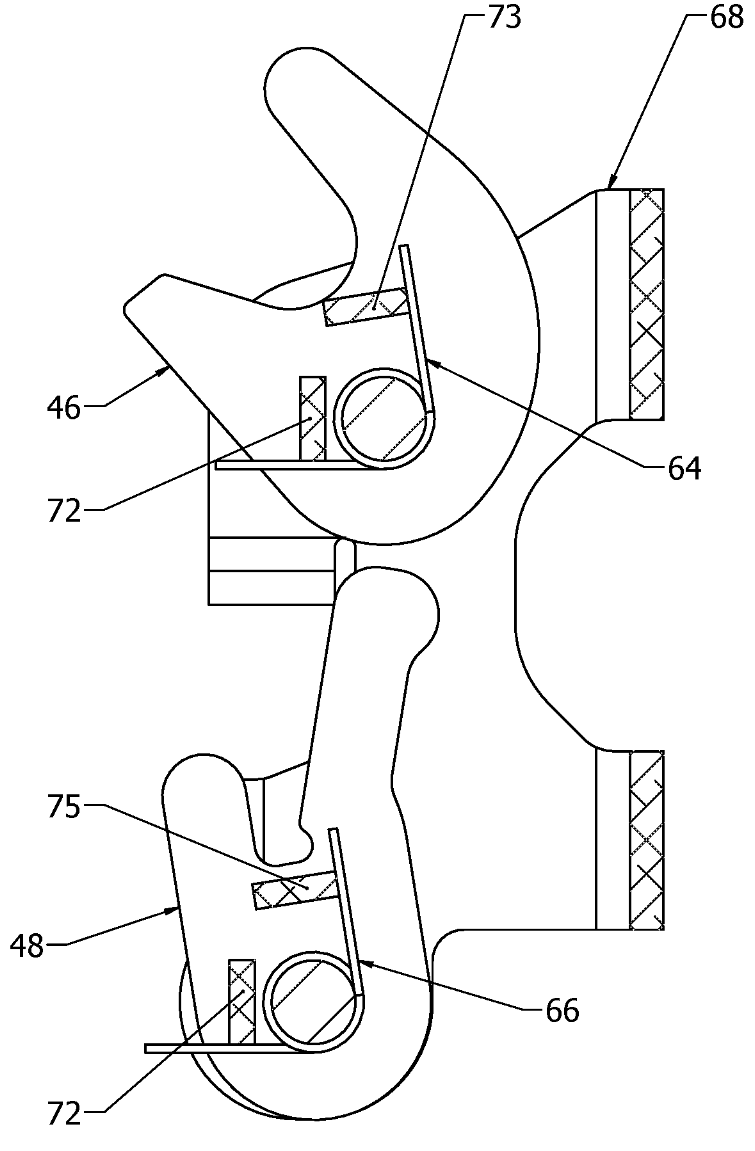
FIG. 24 is a cross-sectional side view of the lock and the retractor when they have been deflected upwards by a base rung.

FIG. 24 is a cross-sectional side view of the lock 46 and the retractor 48 when they had been deflected upwards by a base rung 18. The lock stop 73 has pushed against the top of the lock spring 64 and the frame stop 72 has maintained the bottom of the lock spring 64 in place, causing a biasing force of the top of the lock spring 64 against the lock stop 73. Similarly, the retractor stop 75 has pushed against the top of the retractor spring 66 and the frame stop 72 has maintained the bottom of the retractor spring 66 in place, causing a biasing force of the top of the retractor spring 66 against the retractor stop 75.

Figure 25:
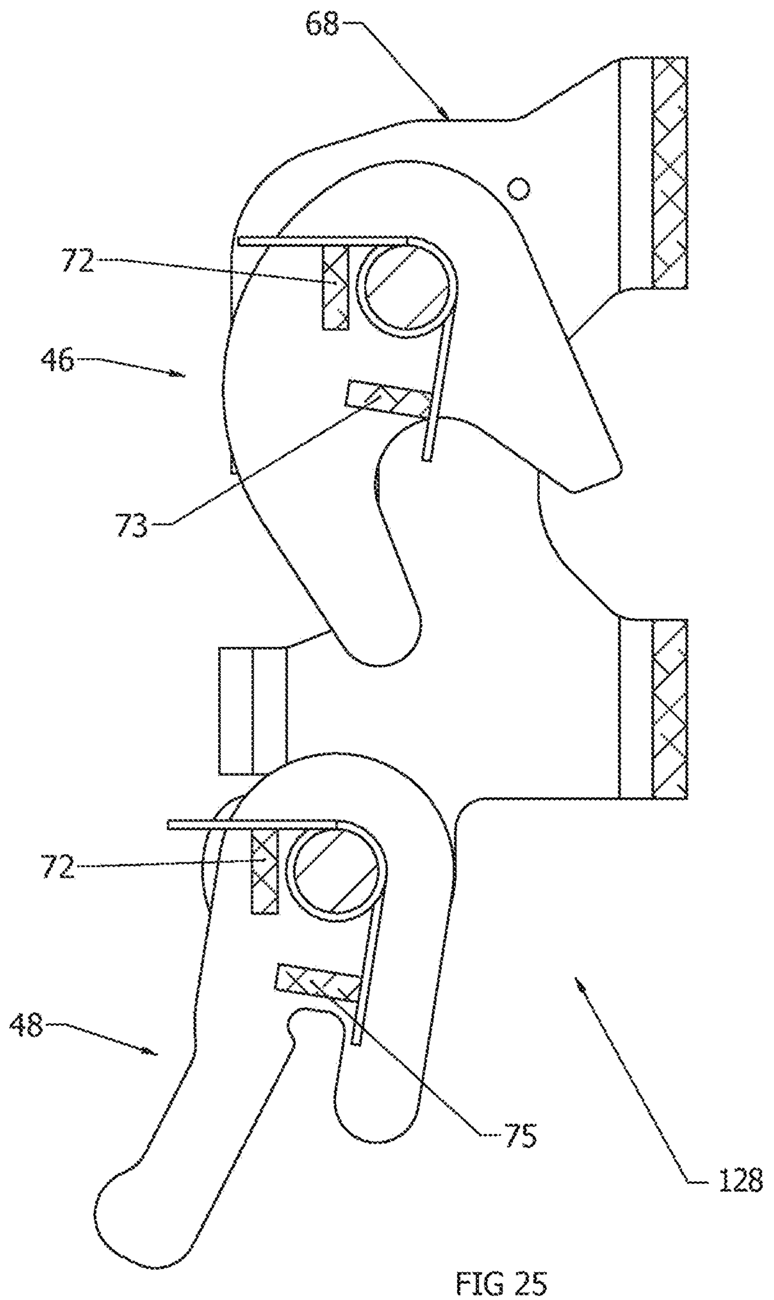
FIG. 25 is a cross-sectional side view of the lock and that retractor when they have been deflected downwards by a base rung.

FIG. 25 is a cross-sectional side view of the lock 46 and that retractor 48 when they have been deflected downwards by a base rung 18. The lock stop 73 has pushed against the bottom of the lock spring 64 and the frame stop 72 has maintained the top of the lock spring 64 in place, causing a biasing force of the bottom of the lock spring 64 against the lock stop 73. Similarly, the retractor stop 75 has pushed against the bottom of the retractor spring 66 and the frame stop 72 has maintained the top of the retractor spring 66 in place, causing a biasing force at the bottom of the retractor spring 66 against the retractor stop 75.

Referring now to the drawings wherein like reference numerals refer to similar or identical parts throughout the several views, and more specifically to FIGS. 26-33 thereof, there is shown a climbing product 10 whose sections are extendable. The climbing product 10 comprises a base section 12 having a first base rail 14 and a second base rail 16 in parallel and spaced relationship with the first base rail 14 and base rungs 18 attached to and between the first and second base rails 14, 16. The climbing product 10 comprises a fly section 20 having a first fly rail 22 and a second fly rail 24 in parallel and spaced relationship with the first fly rail 22 and fly rungs 26 attached to and between the first and second fly rails 22, 24. The fly section 20 in sliding engagement with the base section 12. The climbing product 10 comprises a lock assembly 28 having a lock fly portion 30 directly attached to the fly section 20. The lock fly portion 30 directly engages with the base section 12 to lock the base section 12 with the fly section 20. The lock fly portion 30 has a plunger 39. The lock fly portion 30 disengages from the base portion by moving the plunger 39.

The lock assembly 28 may include a lock base portion 32 directly attached to the base section 12. The lock fly portion 30 directly engages with the lock base portion 32 to lock the fly section 20 to the base section 12. The lock fly portion 30 disengages from the lock base portion 32 by moving the plunger 39. The lock base portion 32 may include a socket 34 disposed in one of the base rungs 18, and the lock fly portion 30 includes a flip lock 36 which fits into the socket 34 to lock the fly section 20 to the base section 12 so the fly section 20 cannot move downwards relative to the base section 12 when the fly section 20 is locked to the base section 12. The flip lock 36 disposed in one of the fly rungs 26.

The flip lock 36 may have a stem 38 which fits into the socket 34 to lock the fly section 20 to the base section 12, an anchor 40 from which the stem 38 extends, a flip axle 42 extending through the anchor 40 about which the anchor 40 with the stem 38 rotates, and a flip spring 44 which biases the stem 38 into a stable position where the stem 38 extends essentially perpendicularly toward the first base rail 14 from the first fly rail 22. The flip lock 36 may have a locking recess 120 into which the plunger 39 moves. When the plunger 39 engages the recess, the flip lock 36 is prevented from rotating about its axis. The flip lock 36 may include a blocker 122. The plunger 39 being able to engage the flip lock 36 to prevent the flip lock's rotation when the blocker 122 is in a first state and does not block the plunger 39 from engaging with the locking recess 120, and the plunger 39 being prevented from engaging the flip lock 36 by the blocking action of the blocker 122 in a second state and the plunger 39 is prevented from engaging with the locking recess 120.

The lock assembly 28 may include a lock lever 112 engaged with the plunger 39 and a lock lever handle 116 directly connected to the lock lever 112. The lock lever handle 116 is moved from its down position to its up position by directly pulling on the lock lever handle 116 which moves the plunger 39 out from the locking recess 120. The lock assembly 28 may include a pulley 124 mounted to the lock lever 112, and including a hoist rope 126 which goes around the pulley 124. By increasing tension in the hoist rope 126, the lock lever 112 is moved from its down position to its up position which moves the plunger 39 out from the locking recess 120.

The present invention pertains to a method for using a ladder whose sections are extendable. The method comprises the steps of moving the ladder to a desired position. The ladder comprises a base section 12 having a first base rail 14 and a second base rail 16 in parallel and spaced relationship with the first base rail 14 and base rungs 18 attached to and between the first and second base rails 14, 16. The ladder comprises a fly section 20 having a first fly rail 22 and a second fly rail 24 in parallel and spaced relationship with the first fly rail 22 and fly rungs 26 attached to and between the first and second fly rails 22, 24. The fly section 20 in sliding engagement with the base section 12 the ladder comprises a lock assembly 28 having a lock fly portion 30 directly attached to the fly section 20. The lock fly portion 30 directly engages with the base section 12 to lock the base section 12 with the fly section 20. The lock fly portion 30 has a plunger 39. The lock fly portion 30 disengages from the base portion by moving the plunger 39. There is the step of moving the plunger 39 so the lock fly portion 30 disengages from base portion. There is the step of sliding the fly section 20 along the base section 12 to extend the ladder to a desired length. There is the step of locking the fly section 20 to the base section 12 with the lock portion at the desired length.

The present invention pertains to a method for constructing a ladder whose sections are extendable. The method comprises the steps of attaching a lock fly portion 30 of the lock assembly 28 directly to a fly section 20 of the ladder. The fly section 20 having a first fly rail 22 and a second fly rail 24 in parallel and spaced relationship with the first fly rail 22 and fly rungs 26 attached to and between the first and second fly rails 22, 24. The fly section 20 in sliding engagement with the base section 12. The lock fly portion 30 has a plunger 39. There is the step of attaching a lock base portion 32 of the lock assembly 28 directly attached to the base section 12. The lock fly portion 30 directly engages with the lock base portion 32 to lock the fly section 20 to the base section 12. The lock fly portion 30 disengages from the lock base portion 32 by moving the plunger 39. The base section 12 having a first base rail 14 and a second base rail 16 in parallel and spaced relationship with the first base rail 14 and base rungs 18 attached to and between the first and second base rails 14, 16.

This invention is an additional feature, and an alternative embodiment for the locking assembly with the flip lock 36 described above. This invention prevents inadvertent unlocking of the Extendable Section Lock by requiring a deliberate action by the user. It is an additional feature that, for instance, may be introduced to the apparatus shown in FIGS. 26-35, and 43-46, and described in this application, specifically embodiment 1, thereof.

This invention prevents the unintended extension of a ladder section, which equates to increased user safety and convenience.

Figure 26:
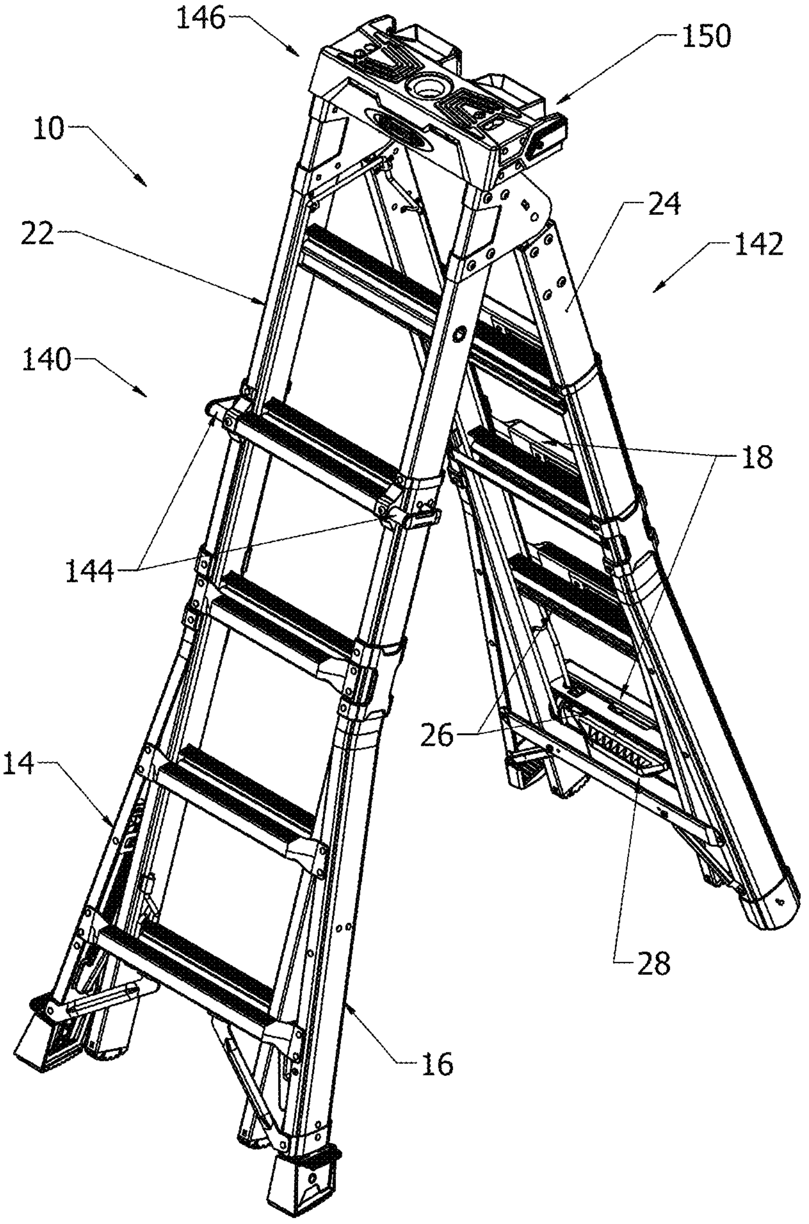
FIGS. 26 and 27 show a ladder known as an NGMF (next generation multi form) ladder.
Figure 27:
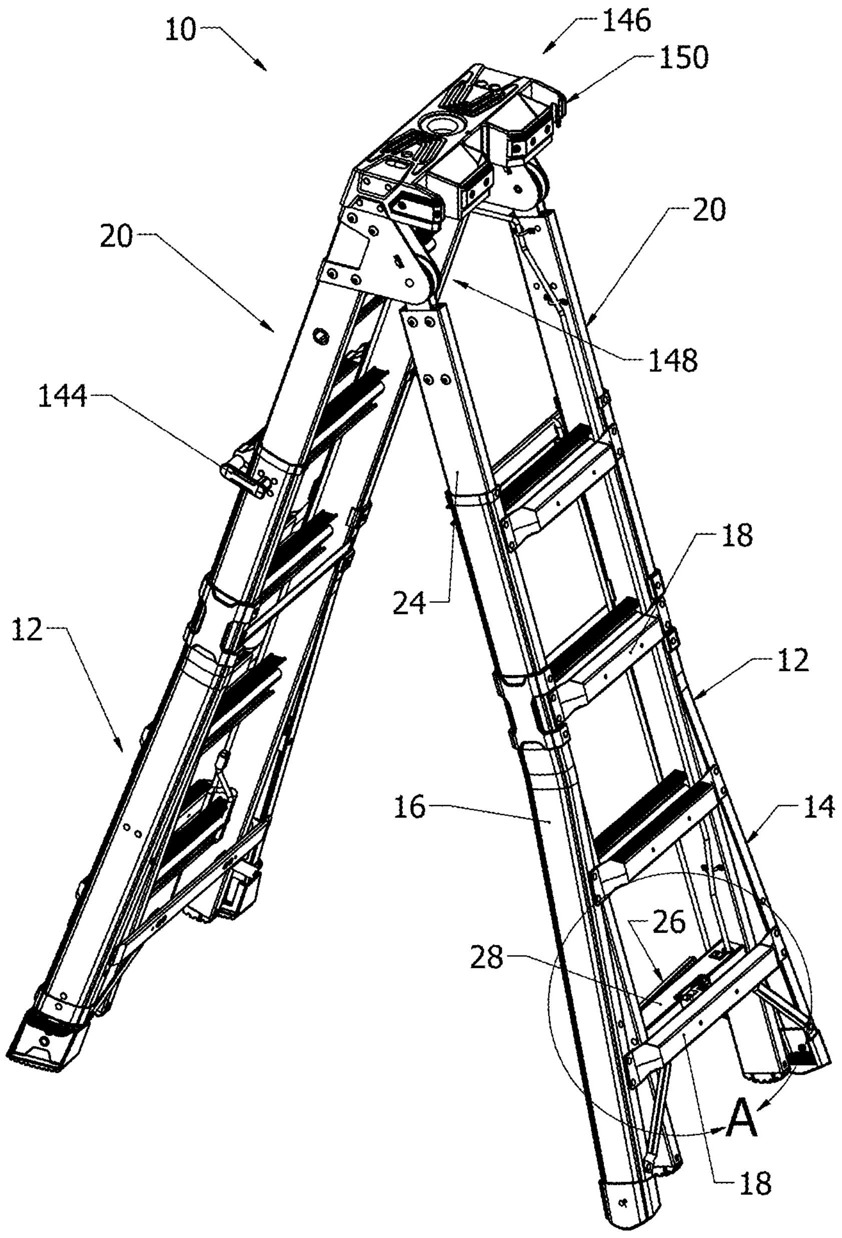

FIGS. 26 and 27 show a ladder known as an NGMF (next generation multi form) ladder. This ladder can be folded and opened like a step ladder and also be put into a straight ladder configuration like an MT ladder. Also like an MT ladder, the NGMF has outer sections attached to its front and rear inner sections. These outer sections may be extended relative to the inner sections to increase the height of the ladder. The NGMF shown uses conventional J locks on its front section. The rear section uses the flip lock 36 invention which is mounted within the lowest rung of the rear inner section.

Figure 28:
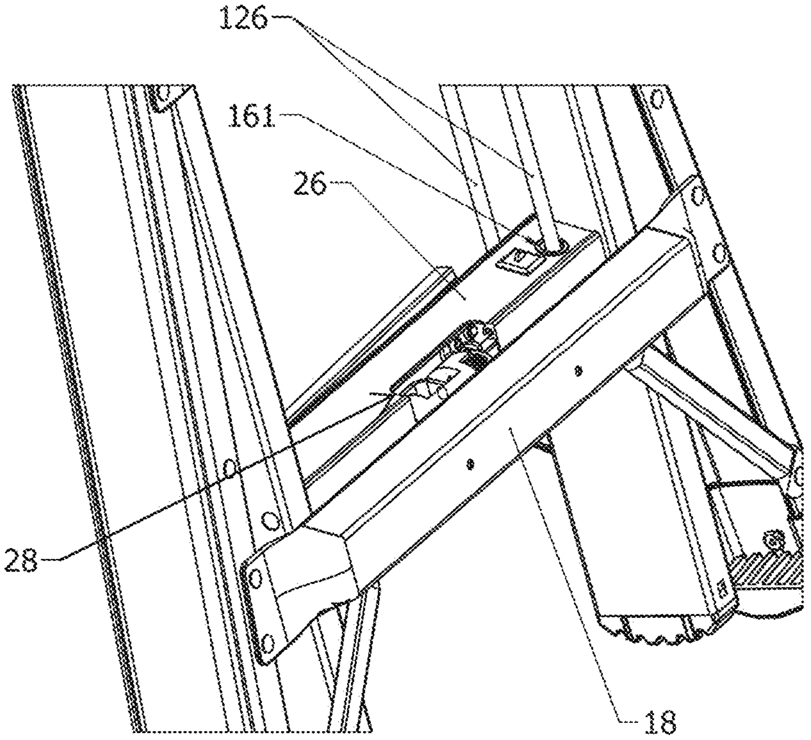
FIG. 28 is a detailed view showing the inner rung with the flip lock engaged with one of the outer rungs.

FIG. 28 is a detailed view showing the inner rung with the flip lock 36 engaged with one of the outer rungs. Also shown is a hoisting rope 126 whose function will be described later. There is a hole 161 in the top surface of the fly rung 26 through which the rope 126 extends and wraps around the pulley 124.

Figure 29:
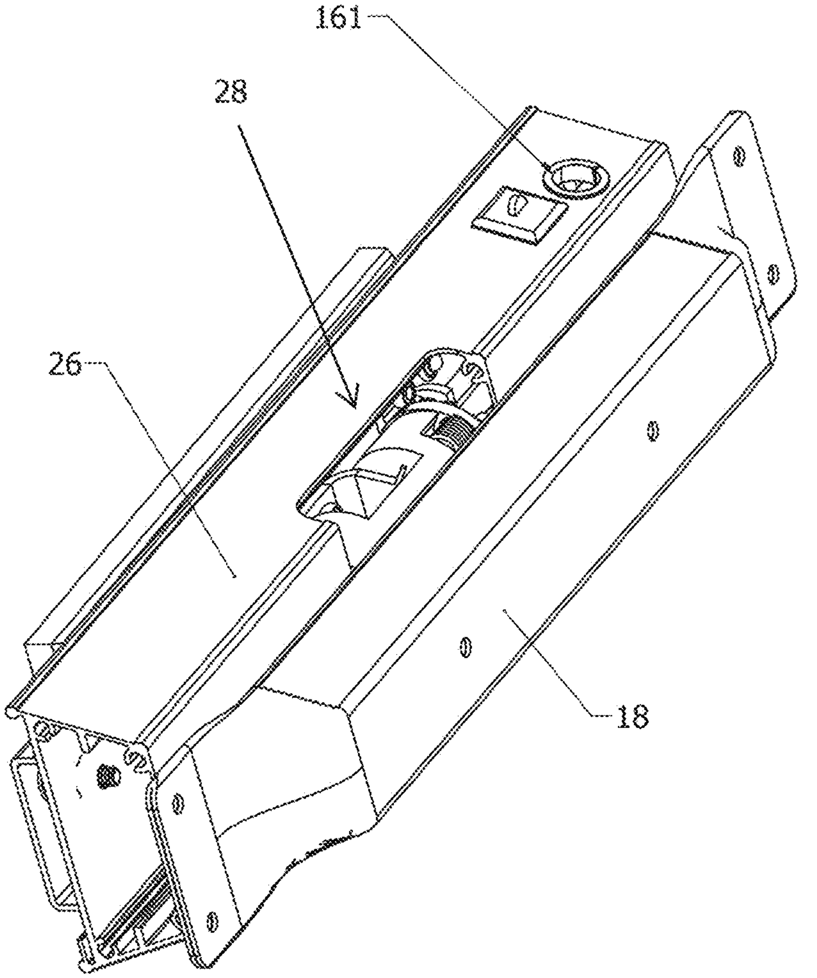
FIG. 29 shows just the inner rung with flip lock and an outer rung.

FIG. 29 shows just the inner rung with flip lock 36 and an outer rung.

Figure 30:
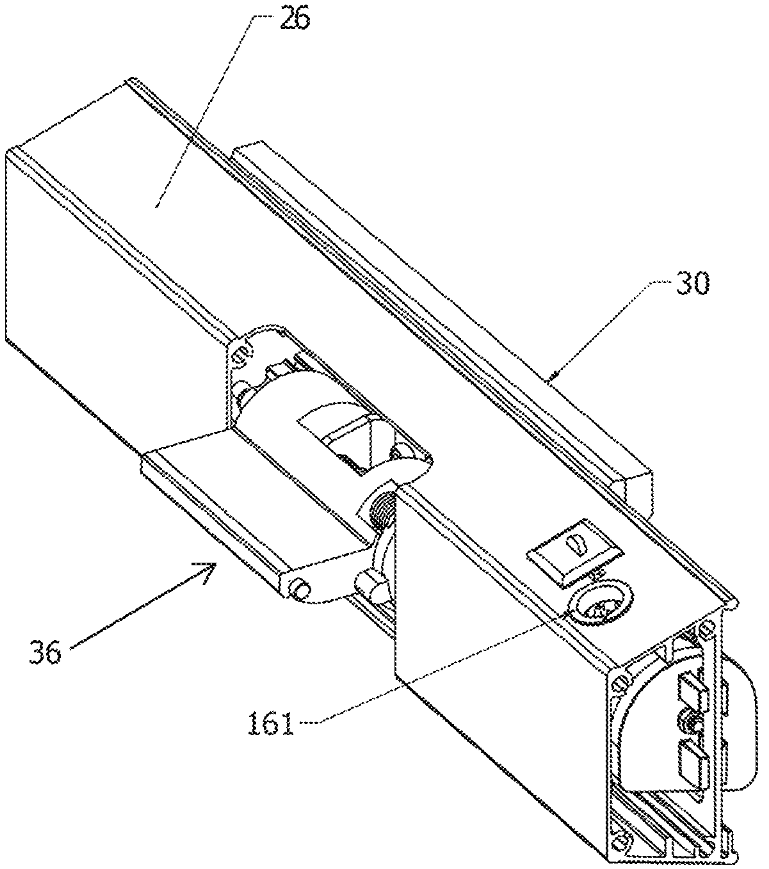
FIG. 30 shows another view of just the inner rung with flip lock.

FIG. 30 shows another view of just the inner rung with flip lock 36.

Figure 31:
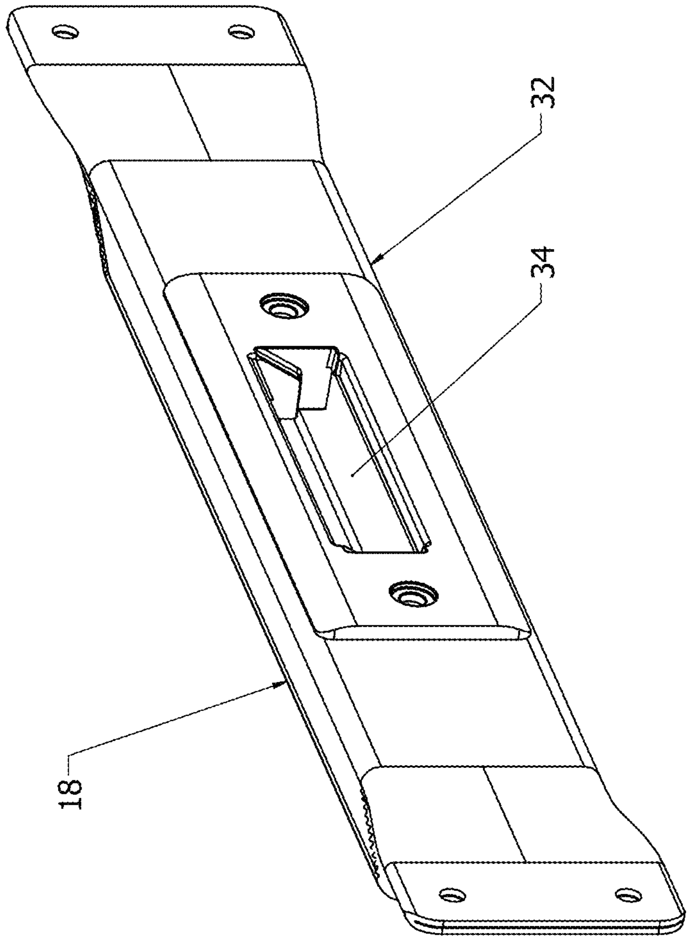
FIG. 31 shows a view of a portion of a typical outer rung with a recess for the flip lock to engage.

FIG. 31 shows another view of a typical outer rung with a recess for flip lock 36 to engage. These recesses are identical regardless of the length of the particular outer rung.

Figure 32:
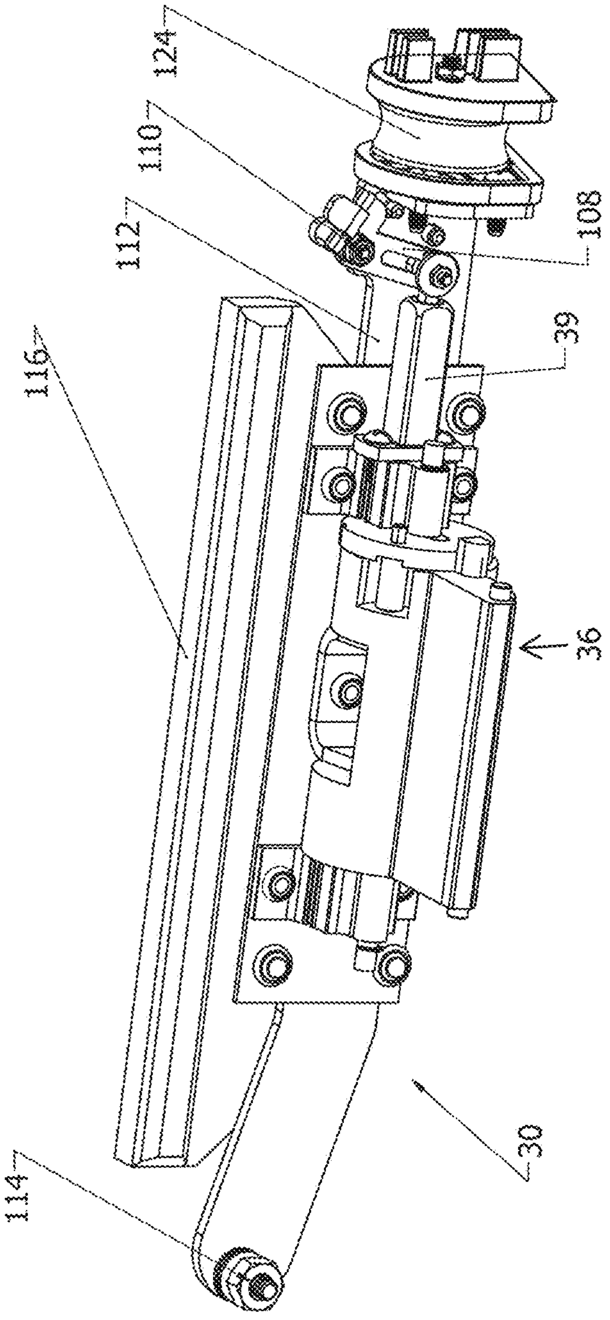
FIG. 32 shows the components of this invention as seen if the inner rung were transparent.

FIG. 32 shows the components of this invention as seen if the inner rung were transparent. Important to note is that the lock lever pivot 114 and the crank pivot 110 are fixed to the inner rung. The lock lever pivot 114 and the crank pivot 110 can rotate about their respective pivots.

Figure 33:
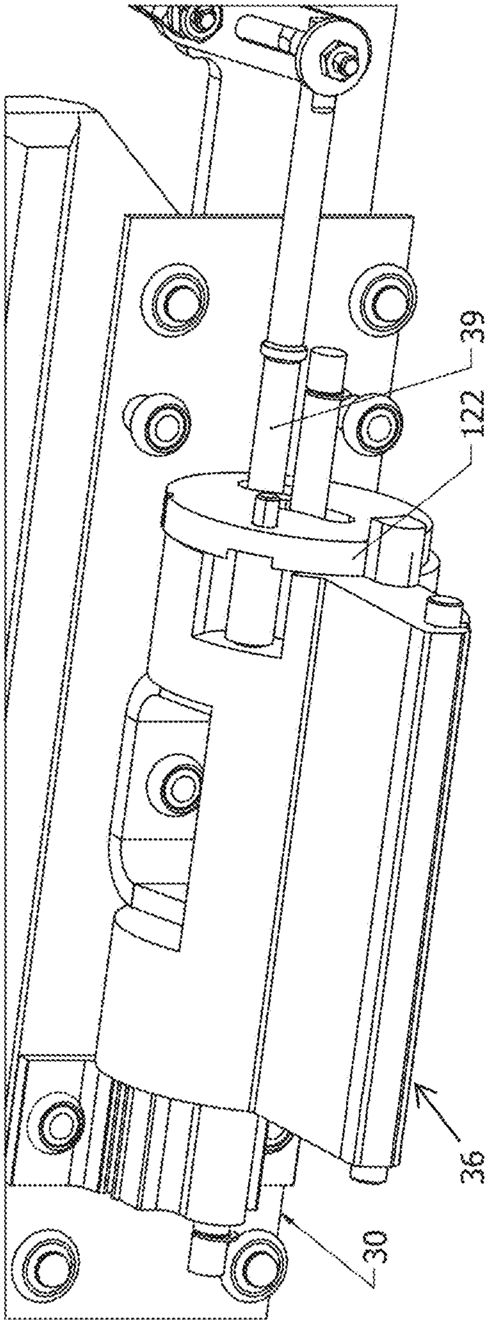
FIG. 33 shows a closeup of FIG. 32 with some additional components made invisible. The key parts of this invention are the flip lock, blocker and plunger.

FIG. 33 shows a closeup of FIG. 32 with some additional components made invisible. The key parts of this invention are the flip lock 36, blocker 122, and plunger 39. The essence of this invention is the plunger 39 being able to engage the flip lock 36 to prevent its rotation in certain conditions, and, the plunger 39 being prevented from engaging the flip lock 36 by the blocking action of the blocker 122 in other conditions.

Figure 34:
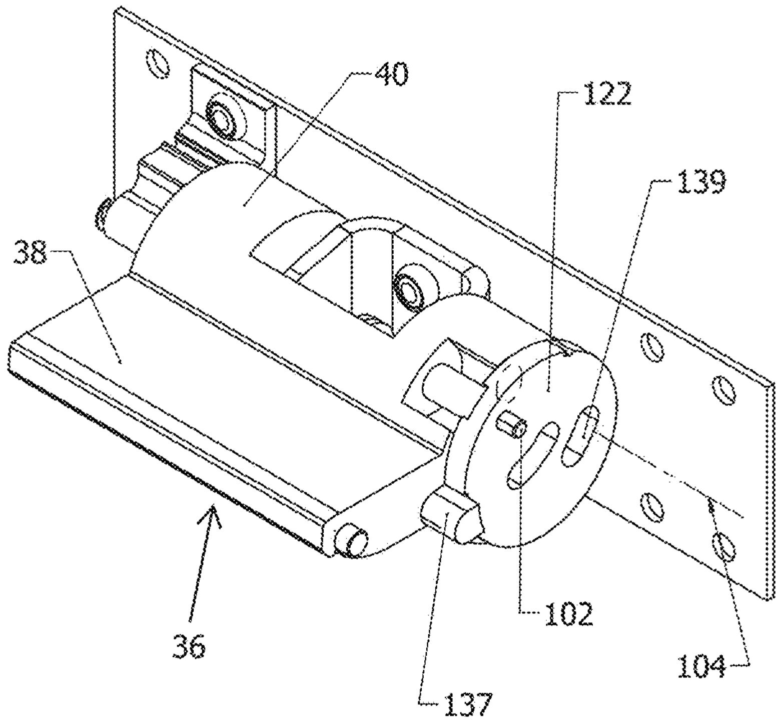
FIG. 34 shows the relationship between the flip lock and the blocker.

FIG. 34 shows the relationship between the flip lock 36 and the blocker 122. The blocker 122 pivot is fixed to the flip lock 36. The blocker 122 can rotate CCW and CW relative to the flip lock 36. The blocker 122 is spring biased towards its extreme CW position as seen in FIGS. 37, 38 and 39.

Figure 35:
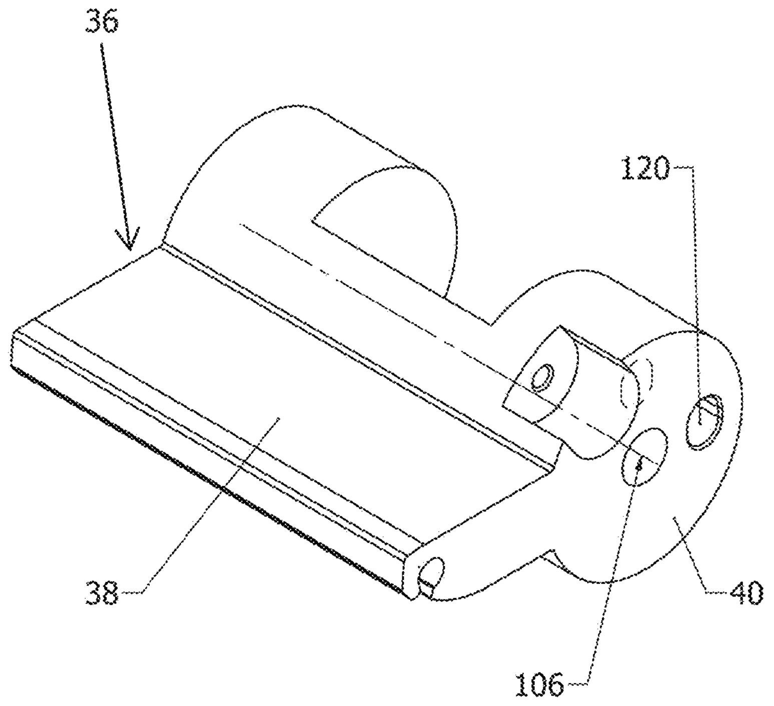
FIG. 35 shows a portion of the flip lock.

FIG. 35 shows a portion of the flip lock 36. The flip lock 36 has a locking recess 120 into which the plunger 39 can go. When the plunger 39 engages this recess, the flip lock 36 is prevented from rotating about its axis.

Figure 36:
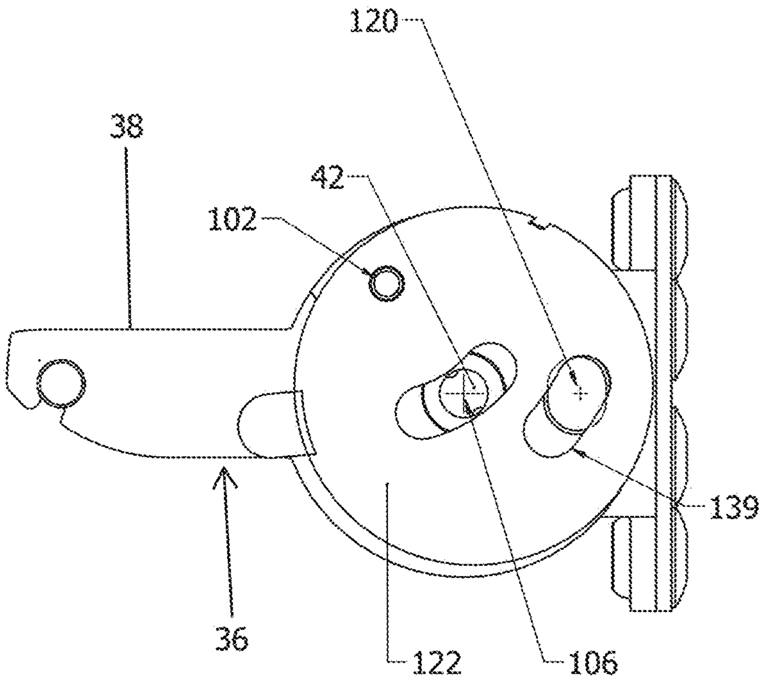
FIG. 36 shows the conditions under which the plunger is able to engage the plunger locking recess in the flip lock: the flip lock is horizontal and the blocker is rotated to its extreme CCW position relative to the flip lock.

FIG. 36 shows the conditions under which the plunger 39 is able to engage the plunger 39 locking recess 120 in the flip lock 36: the flip lock 36 is horizontal and the blocker 122 is rotated to its extreme CCW position relative to the flip lock 36.

Figure 37:
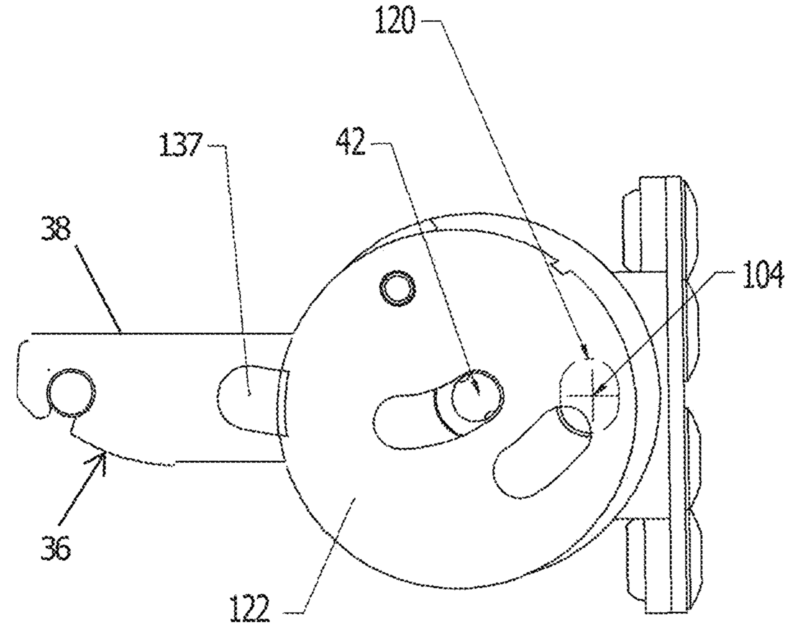
FIG. 37 shows how the plunger (axis shown by + symbol) is prevented from engaging the plunger locking recess (shown as a dashed line) whenever the blocker is in its extreme CW position relative to the flip lock pointing horizontal.
Figure 38:
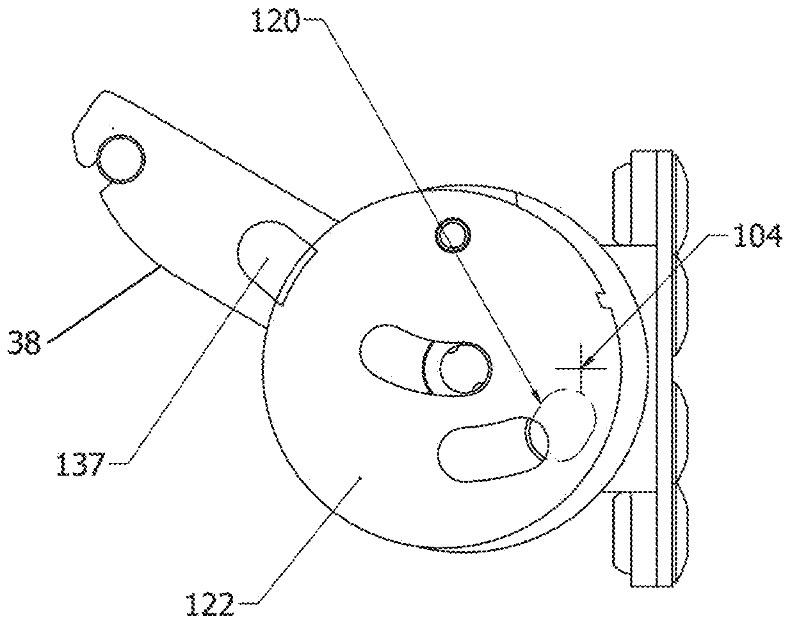
FIG. 38 shows how the plunger (axis shown by + symbol) is prevented from engaging the plunger locking recess (shown as a dashed line) whenever the blocker is in its extreme CW position relative to the flip lock pointing upward.
Figure 39:
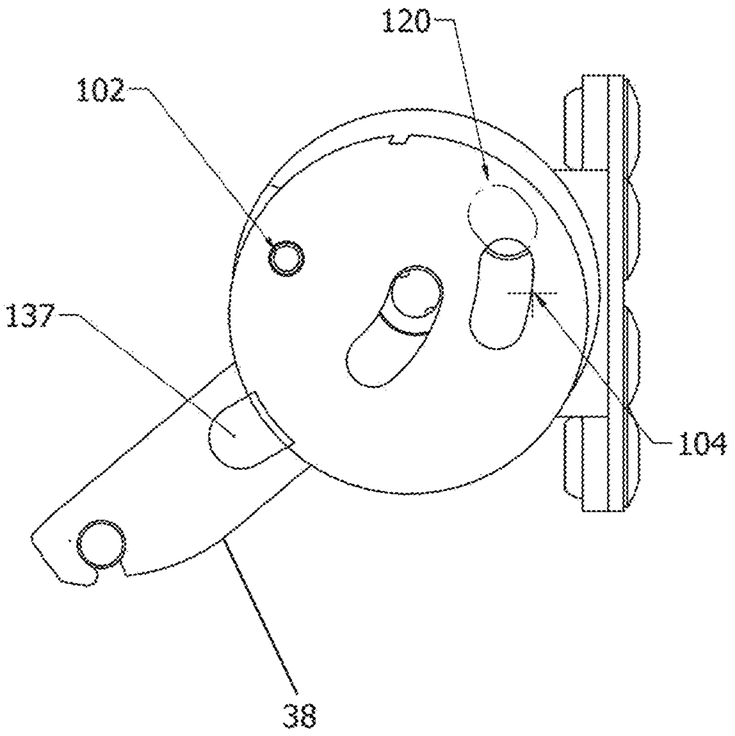
FIG. 39 shows how the plunger (axis shown by + symbol) is prevented from engaging the plunger locking recess (shown as a dashed line) whenever the blocker is in its extreme CW position relative to the flip lock pointing downward.

FIGS. 37, 38 and 39 show how the plunger 39 (axis shown by + symbol) is prevented from engaging the plunger 39 locking recess 120 (shown as a dashed line) whenever the blocker 122 is in its extreme CW position relative to the flip lock 36.

Figure 40:
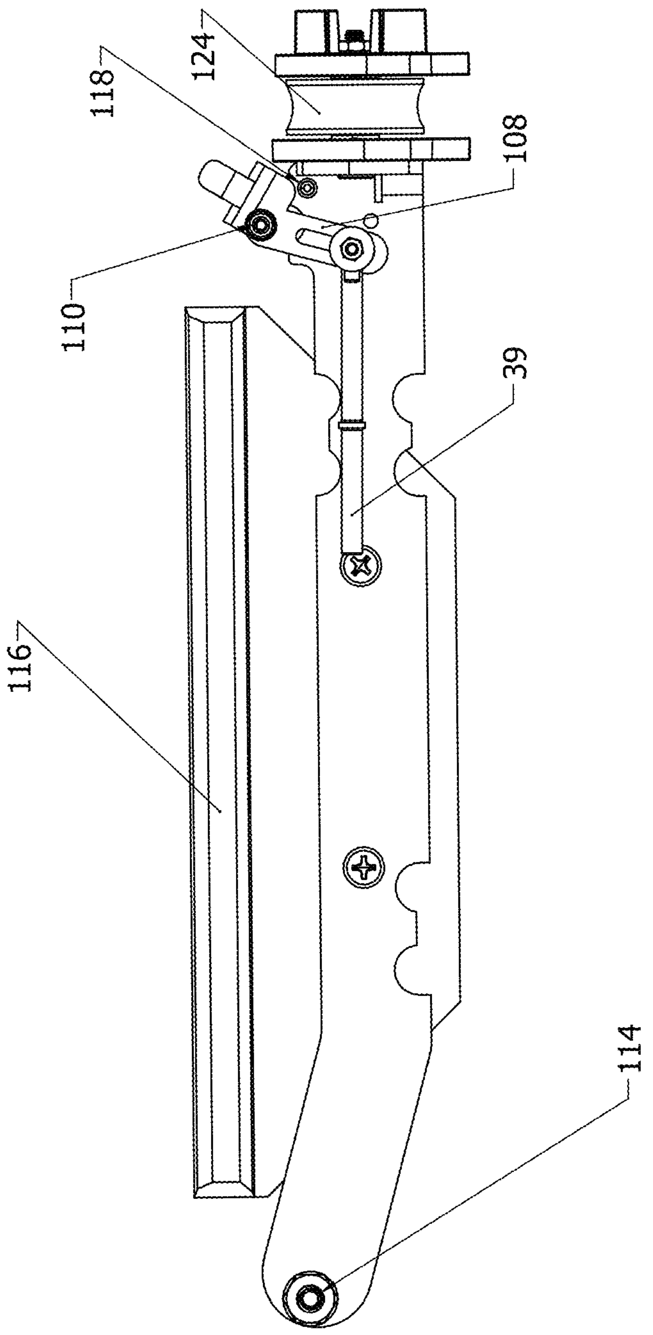
FIG. 40 shows the function of the lock lever and the plunger when the right end of the lock lever is down.
Figure 41:
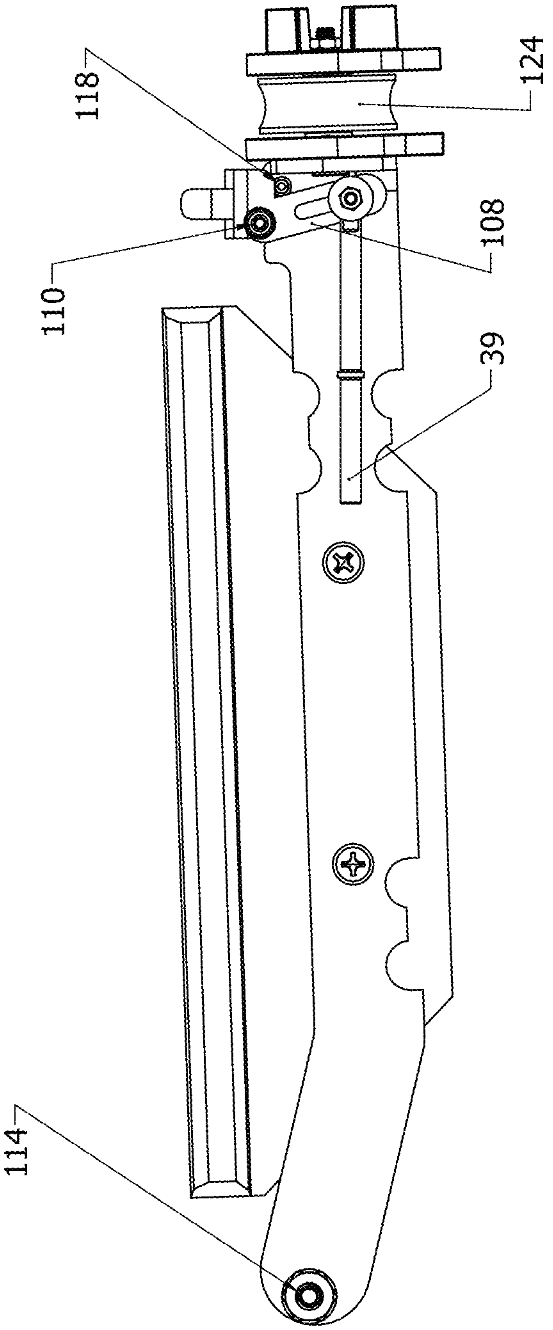
FIG. 41 shows the function of the lock lever and the plunger when the right end of the lever is lifted.

FIGS. 40 and 41 show the function of the lock lever 112 and the plunger 39. When the right end of the lock lever 112 is down as in FIG. 40, the plunger 39 is in its left or engaged position with the locking recess 120. (This assumes that the blocker 122 is not preventing the plunger 39 from entering the plunger 39 locking recess 120 in the flip lock 36.)

When the right end of the lever is lifted as in FIG. 41, the plunger 39 is moved to its right or disengaged position from the locking recess 120. The plunger 39 is moved by the action of the stud 118 on the lock lever 112 which causes the crank 108 to rotate.

The lock lever 112 is moved from its down position to its up position by the user either directly pulling on the lock lever handle 116 which is directly connected to the lock lever 112, or by increasing the tension in the hoist rope 126 which goes around the pulley 124 mounted on the right end of the lock lever 112.

Figure 42:
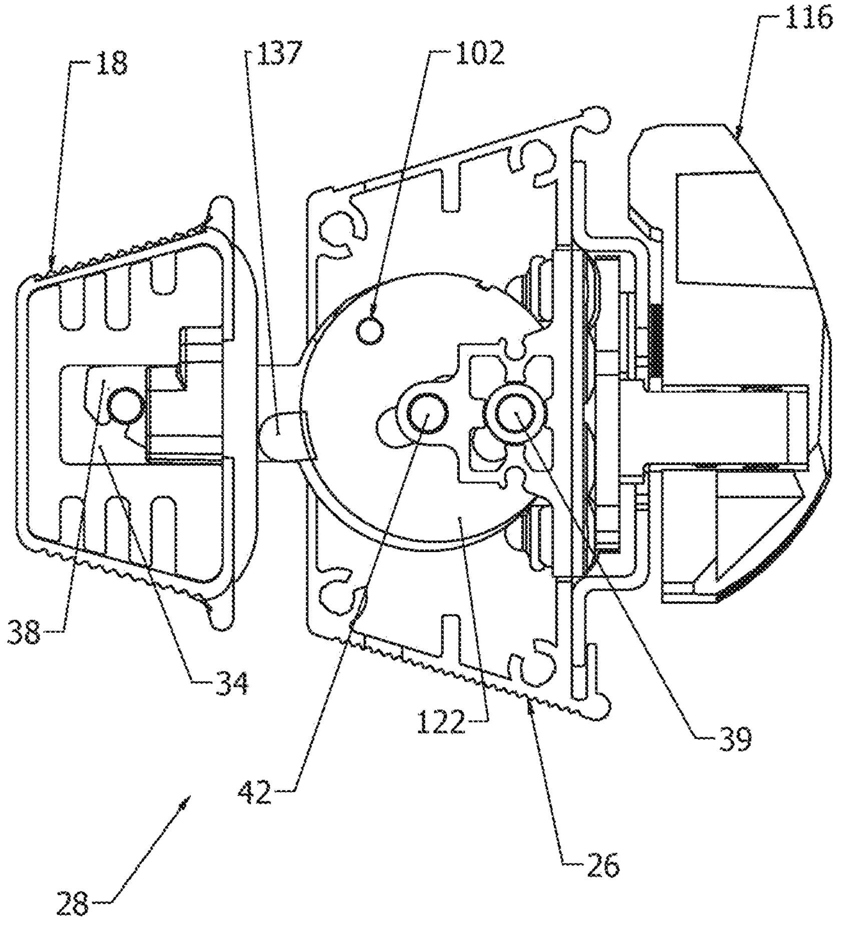
FIG. 42 shows a cross-section of the flip lock engaged with the socket in an outer rung.

FIG. 42 shows how the contact between the blocker 122 against the outer rung positions the blocker 122 CCW relative to the flip lock 36, as seen in FIG. 36. Thus, FIG. 42 shows the only situation in which the blocker 122 allows the plunger 39 to prevent the rotation of the flip lock 36: the flip lock 36 is fully engaged with the recess in outer rung and the lock lever 112 is allowed to move to its down position.

Figure 43:
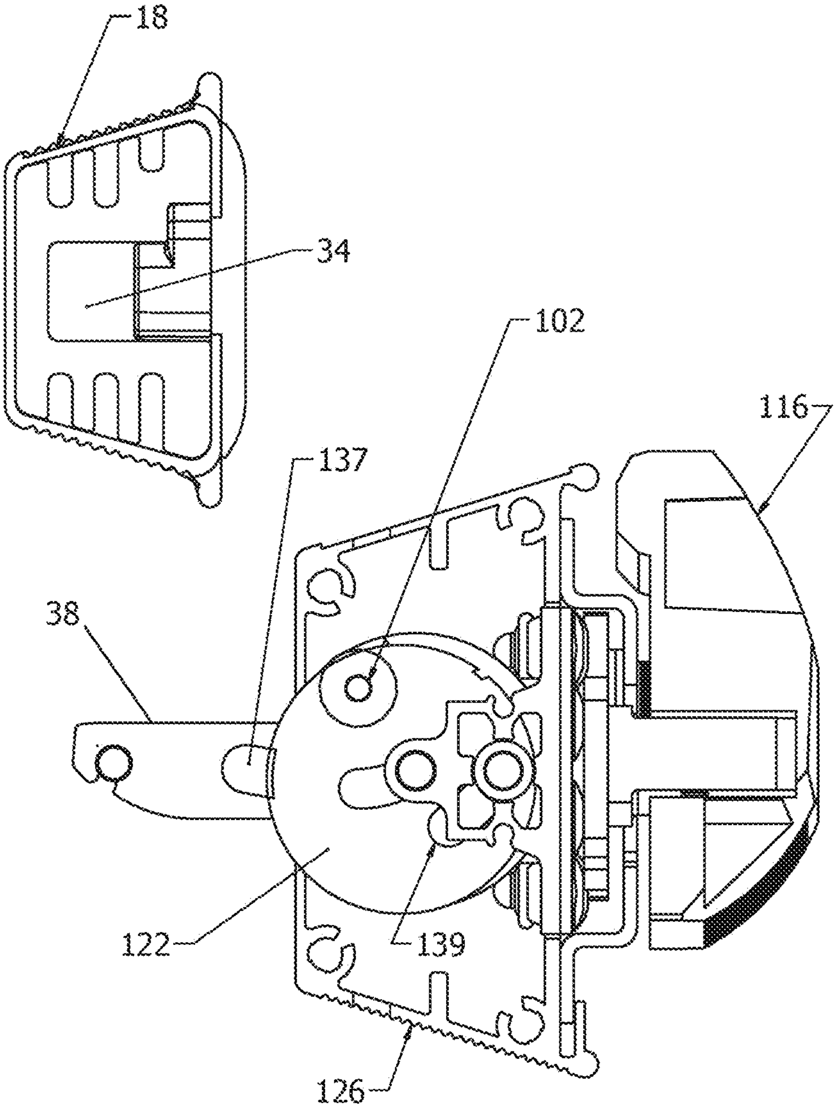
FIG. 43 shows a cross-section of the flip lock disengaged from the socket in the outer rung.

FIG. 43 shows the situation whenever the flip lock 36 is NOT engaged in the recess in an outer rung: the blocker 122 prevents the plunger 39 engaging the flip lock 36 so the flip lock 36 is free to move in the manner of the previously disclosed flip lock 36 invention.

As shown in FIGS. 32, 33, 40 and 41, when the hoist rope 126 wrapped around the pulley 124 is pulled taught to lift the fly section 20 relative to the base section 12, or the lock lever handle 116 is listed, the lock lever 112 rotates upwards about the lock lever pivot 114. As the lock lever 112 moves upwards, a stud 118 pushes against a crank 108, as shown in FIG. 40, causing the crank 108 to pivot around the crank pivot 110 and pull the plunger 39, which is directly connected to the crank 108, out from the locking recess 120 and be completely withdrawn from the flip lock 36, as shown in FIG. 41. With the plunger 39 completely withdrawn from the flip lock 36, the flip lock 36 is free to rotate about the flip lock axis 106. When the rope 126 is released, or the lock lever handle 116 is let go, the lock lever pivot 114 moves back down about the lock lever pivot 114, causing the stud 118 to move back away from the crank 108 and the crank 108 to rotate clockwise about the crank pivot 110, which causes the plunger 39 to move forward to try to enter the locking recess 120 again. If the blocker 122 is in the way of the locking recess 120, the blocker 122 prevents the plunger 39 from entering the locking recess 120 and re-engaging with the flip lock 36 to lock the flip lock 36 in place.

When the fly section 20 is locked with the base section 12, the flip lock 36 has its stem 38 in the socket 34 of the desired base rung with respect to the height of the fly section 20 relative to the base section 12. In this event, the plunger 39 is disposed in the locking recess 120 preventing the flip lock 36 from being able to rotate, as shown in FIG. 36 and FIG. 42, and thus preventing the flip lock 36 from coming out of the locking recess 120 and consequently preventing the fly section 20 moving relative to the base section 12.

When it is desired to reconfigure the position of the fly section 20 relative to the base section 12, either the hoist rope 126 is pulled, or the handle is lifted to cause the plunger 39 to withdraw from the locking recess 120 and free the flip lock 36 to rotate, as explained above. The fly section 20 is then lifted relative to the base section 12, which causes the stem 38 of the flip lock 36 to withdraw from the socket 34. This is able to occur because the bottom front surface of the stem 38 is curved, and as the fly section 20 is lifted, it causes the stem 38 of the flip lock 36 to go with the fly section 20 and slide out unobstructed from the socket 34. Because the flip lock 36 is now free of the socket 34, the fly section 20 is able to continue to be lifted unimpeded. Once the blocker 122 attached to the flip lock 36 clears the base rung the flip lock 36 was just in, the nose 137 of the blocker 122 is no longer displaced by the base rung, and the blocker 122 is biased back to its stable position by the flip lock spring, causing the blocker 122 to rotate clockwise about the blocker pivot 102 over the locking recess 120 so the plunger 39 cannot slide into the locking recess 120, as shown in FIG. 43, because the plunger axis 104 of the plunger 39 that aligns with the locking recess is blocked by the blocker 122. It should be noted that only when the nose 137 of the blocker 122 is deflected by the base rung and rotates counter clockwise about the pivot blocker 102, can the plunger 39 engage and move into the locking recess 120. In all other positions, the flip lock spring biases the blocker 122 into a position that blocks the plunger 39 from sliding into the locking recess 120.

Even when the rope 126 is tensioned or the handle is pulled up and the plunger 39 has withdrawn from the locking recess 120, the fly section 20 is prevented by the flip lock 36 inserted in the socket 34 to be moved directly down. This is because the top surface of the stem 38 is flat, so when the fly section 20 is moved down, the top surface of the stem 38 hits the top of the socket 34 and has nowhere to go, as explained above in regard to the first embodiment of the flip lock 36. In this instance, the flip lock 36 cannot slide out of the socket 34. Accordingly, only when the fly section 20 is lifted upwards, can the flip lock 36 withdraw from the socket 34, and the plunger 39 has been withdrawn.

Once the fly section 20 has been lifted and the flip lock 36 has cleared the base rung, the fly section 20 can be moved downward. As the fly section 20 moves down, the flip lock 36 and the nose 137 strike the top of the base rung and are deflected upwards, as shown in FIG. 38. It should be noted that the blocker 122 pivots forward CW about the blocker 122 pivot and the flip lock axle moves to the rightmost position of the blocker slot 139 because the nose 137 is no longer being deflected by the base rung. As the fly section 20 continues to move down, the stem 38 of the flip lock 36 slides past the socket 34 of the base rung and continues moving down until it clears the base rung, where the flip lock 36 and the blocker 122 will revert to the position shown in FIG. 37.

When the fly section 20 is being lifted upwards, the stem 38 of the flip lock 36 and the nose 137 of the blocker 122 will strike the bottom of the base rung in the deflected downwards by the base rung, as shown in FIG. 39. As the fly section 20 continues to be moved upwards, the stem 38 and the nose 137 will move past the socket 34 of the base rung and continue upwards until the flip lock 36 and the blocker 122 cleared the base rung, whereupon they will revert back to the position shown in FIG. 37. Only one fly rung 26 has the flip lock 36 and blocker 122 arrangements, but at least some if not all of the base rungs 18 will have a socket 34 so the fly section 20 can be positioned at a desired height relative to the base section 12 by having the flip lock 36 for the into the desired socket 34.

For the flip lock 36 to be repositioned in a socket 34 of another base rung, this can only occur as the fly section 20 is moving up relative to the base section 12. Instead of the flip lock 36 passing past a socket 34, as the fly section 20 is moved upward, as explained above, the fly section 20 is stopped from continuing to move upward about where the fly rung 26 with the flip lock 36 is essentially adjacent to the base rung. At this point, the top surface of the flip lock 36 will be inserted slightly into the socket 34, with the flip lock 36 and buttress positioned essentially as shown in FIG. 39. When the top of the flip lock 36 hits the top surface of the socket 34, there may be heard a clicking or contact sound to alert the user that the flip lock 36 is properly position. Then, the fly section 20 is moved down slightly so the stem 38 of the flip lock 36 slides fully into the socket 34 and the nose 137 of the blocker 122 is deflected downwards by the base rung and takes the position shown in FIG. 36. As explained above, the configuration of FIG. 36 has the blocker 122 opening now aligned with the locking recess 120, so the plunger 39 now slides into the locking recess 120 and engages with the flip lock 36, to lock the flip lock 36 in place with the socket 34 of the base rung.

Figure 44:
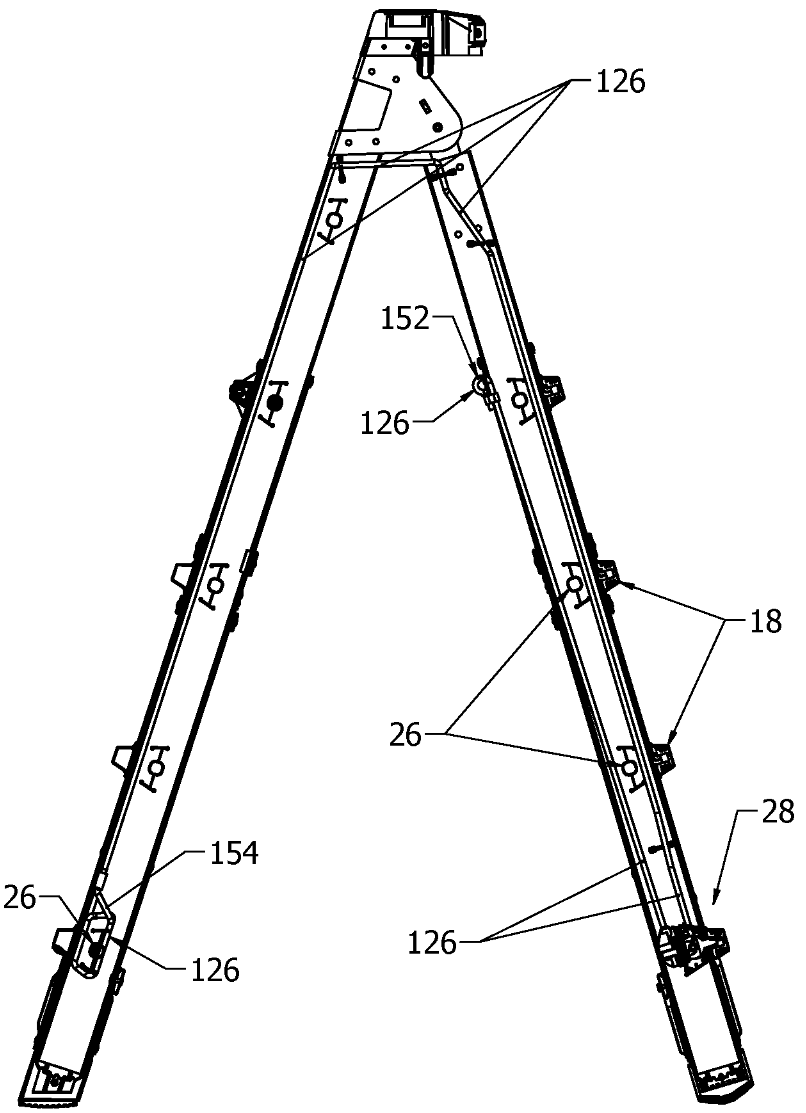
FIG. 44 is a cross section that shows the routing of the hoist rope between the base section and the fly section.

FIG. 44 shows the routing of the hoist rope 126 between the base section 12 and the fly section 20. A first end 152 of the rope 126 is attached to the top of the outer/base section 12 of the rear section 142. From there, the rope 126 extends down the base rail of the rear section 142, where the rope 126 passes around the pulley 124 on the lock lever 112. From there, the rope 126 extends along the base rail and the fly rail above the base rail to the hinge 148 where it is routed to the front section 140. At the front section 140 extends down along the fly rail of the front section 140 to the base rail below the fly rail of the front section 140 where the second end 154 of the rope 126 is attached to the lowest fly rung 26 on the inner/fly section 20 of the front section 140.

Figure 45:
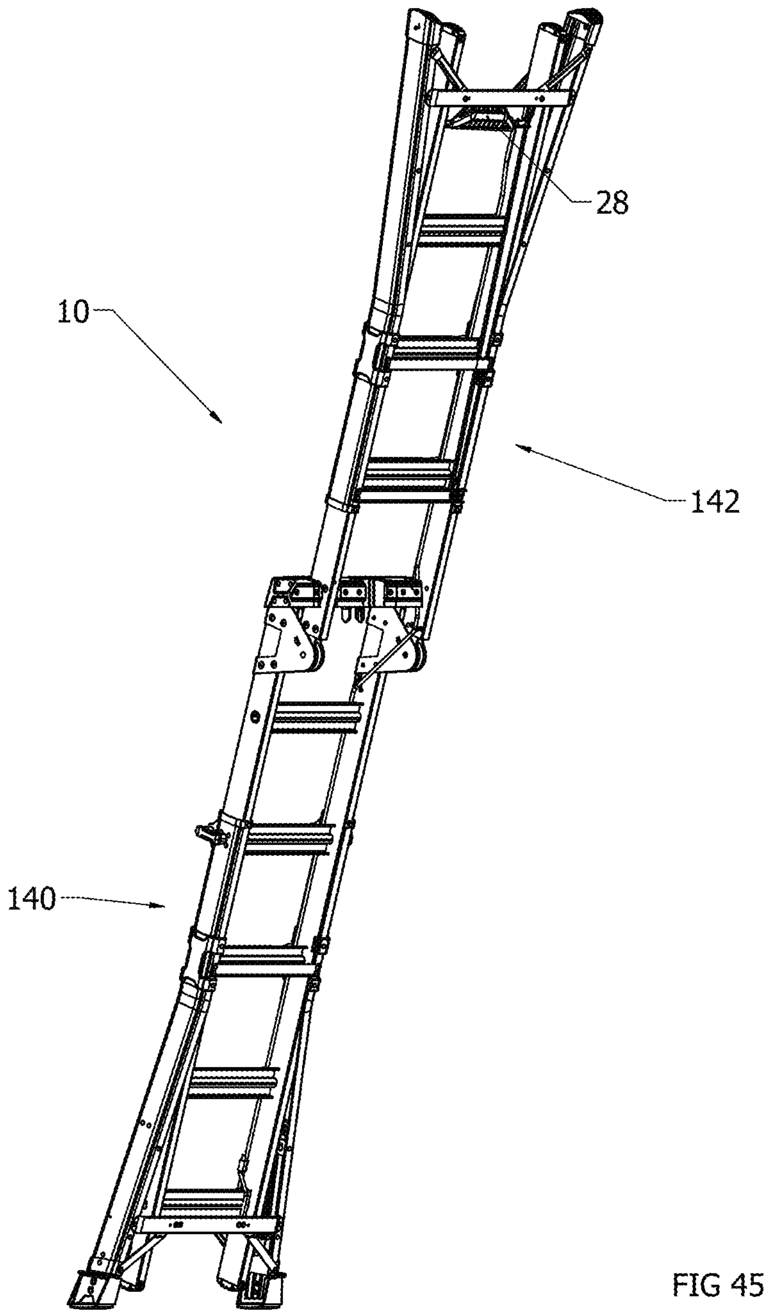
FIG. 45 shows the ladder in the fully extended straight extension ladder position from the non-climbing side.

FIG. 45 shows the ladder in the fully extended straight extension ladder position from the non-climbing side.

Figure 46:
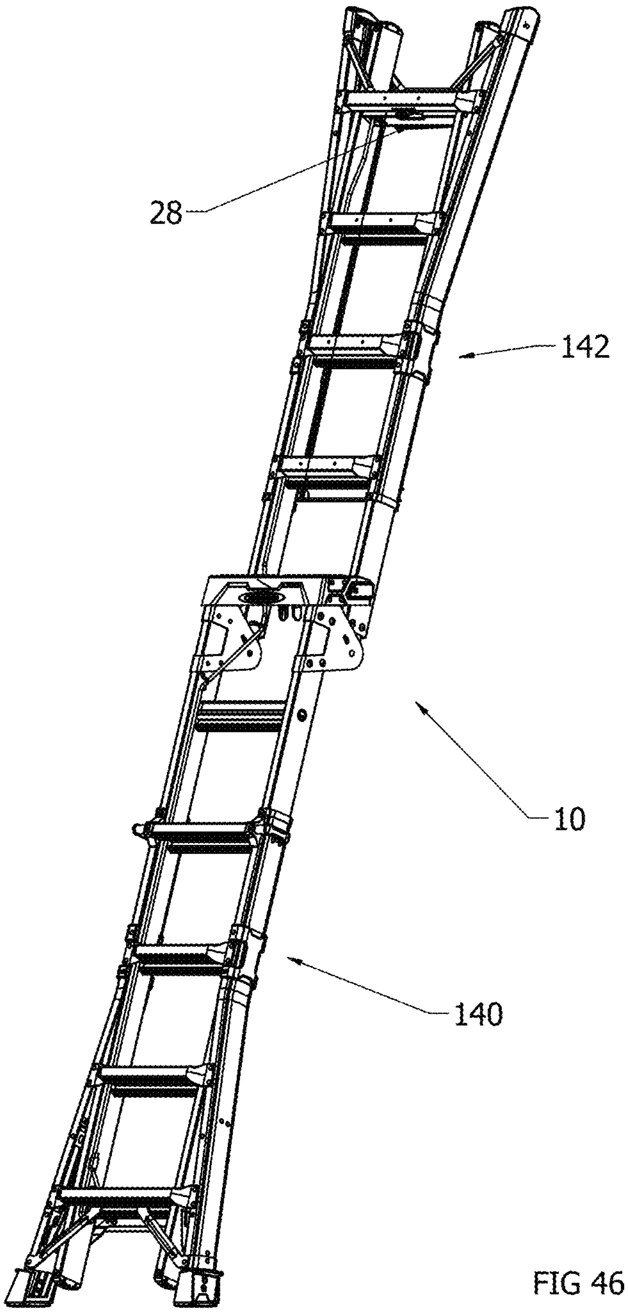
FIG. 46 shows the ladder in the fully extended straight extension ladder position from the climbing side.

FIG. 46 shows the ladder in the fully extended straight extension ladder position from the climbing side.

Figure 47A:
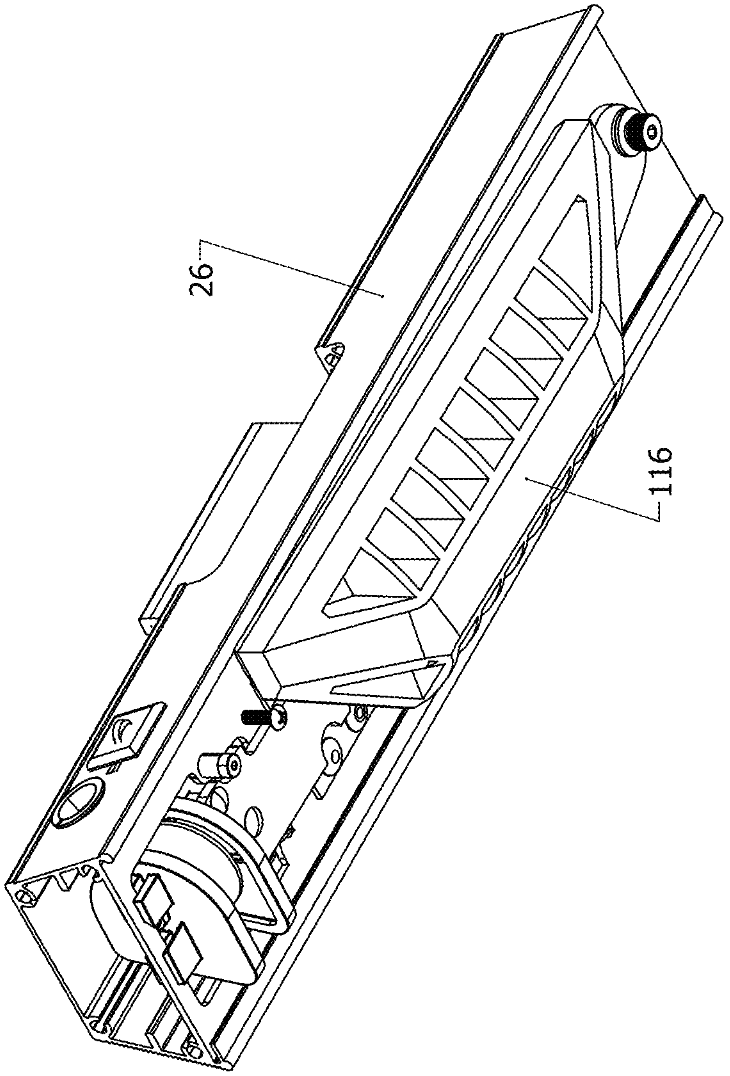
FIG. 47A is a perspective view of the top of the fly rung and lock assembly.
Figure 47B:
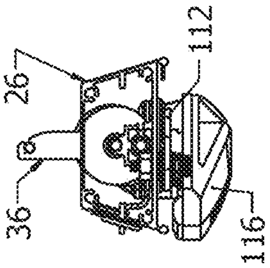
FIG. 47B is a right side view of the fly rung and lock assembly.
Figure 47E:
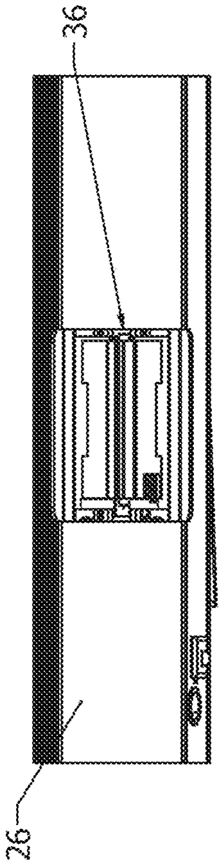
FIG. 47E is a front side, upside down of the fly rung and lock assembly.
Figure 47D:
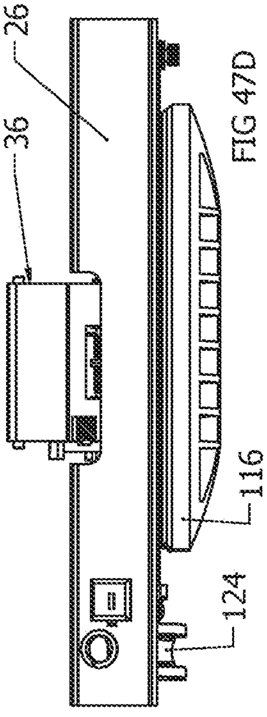
FIG. 47D is a top view of the fly rung and lock assembly.
Figure 47C:
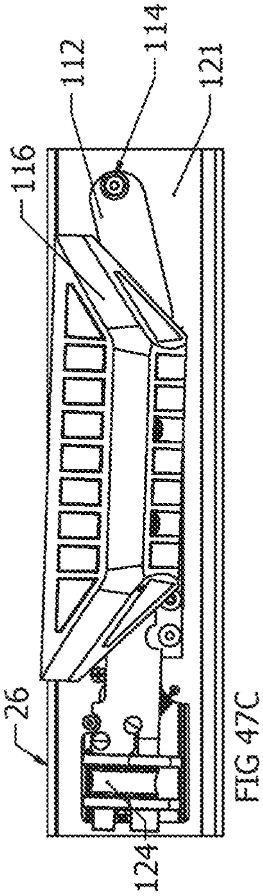
FIG. 47C is a backside/right side view of the fly rung and lock assembly.
Figure 47F:
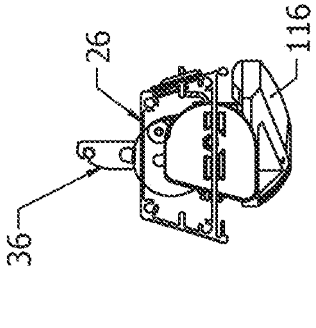
FIG. 47F is a left side view of the fly rung and lock assembly

FIG. 47A-47E show multiple views of the lock lever 112 and lock lever handle 116 in place on the fly rung 26. The lock lever 112 and lock lever handle 116 are mounted external to the back wall 121 of the fly rung 26. The pulley 124 on the lock lever 112 however intrudes into the interior of the fly rung 26. FIG. 47A is a perspective view of the top of the fly rung 26 and lock assembly 28. FIG. 47B is a right side view of the fly rung 26 and lock assembly 28. FIG. 47C is a backside/right side view of the fly rung 26 and lock assembly 28. FIG. 47D is a top view of the fly rung 26 and lock assembly 28. FIG. 47E is a front side, upside down of the fly rung 26 and lock assembly 28. FIG. 47F is a left side view of the fly rung 26 and lock assembly 28. As can be seen from these figures, the lock assembly 28 essentially fits within and is protected by the fly rung 26. The flip lock 36 and the handle 116 of the lock assembly 28 are basically the only components which extend beyond the fly rung 26.

Figure 48:
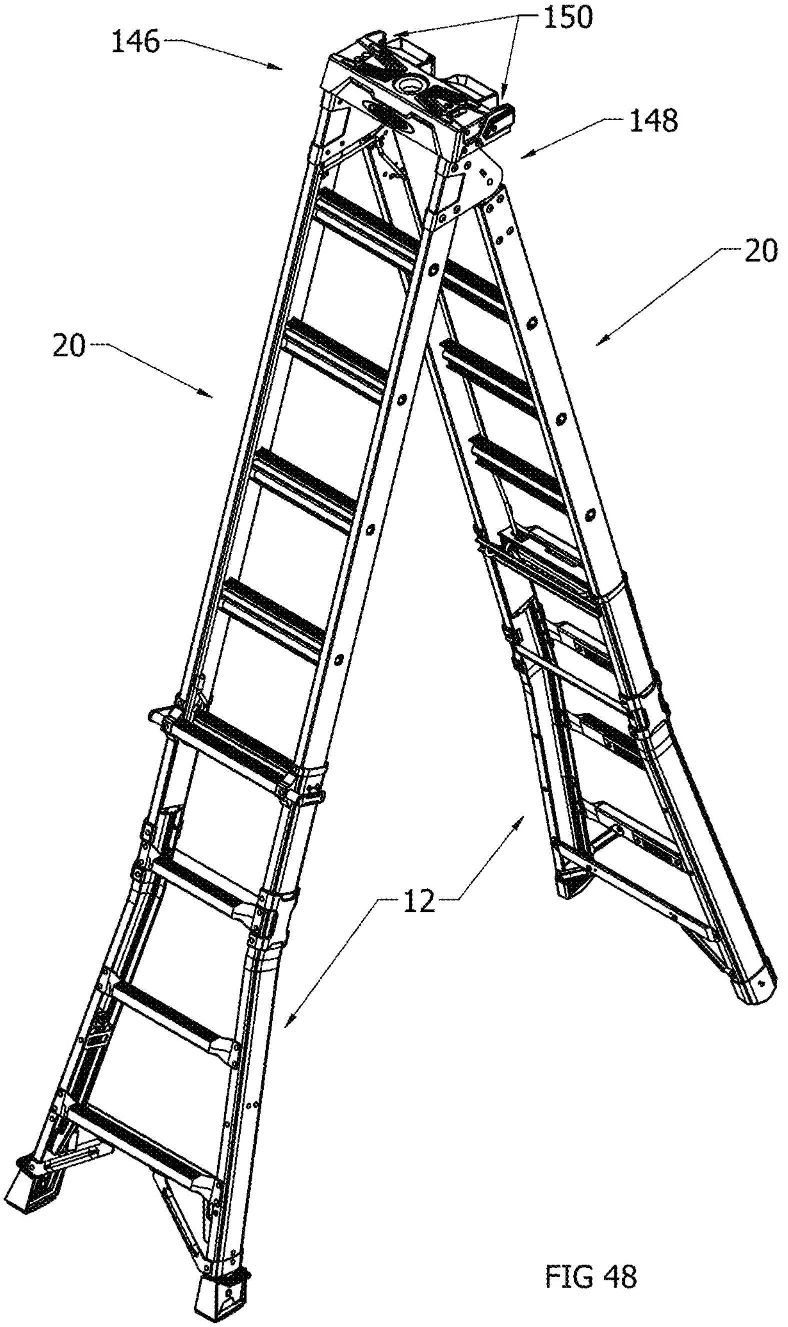
FIG. 48 is a perspective view of the ladder with the fly sections extended.
Figure 49:
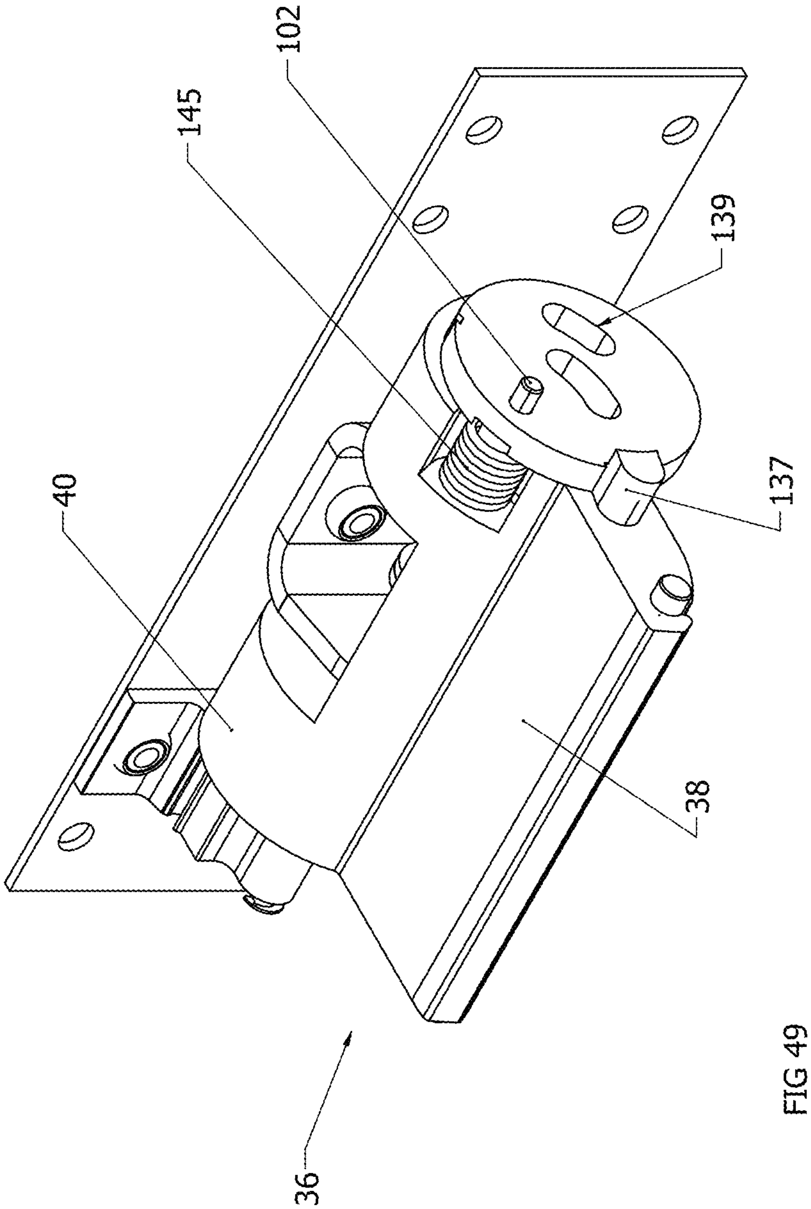
FIG. 49 is a perspective view of the flip lock with the blocker and the flip lock spring, which biases the blocker, in place in the flip lock and adjacent the blocker.

FIG. 48 is a perspective view of the ladder with the fly sections extended. FIG. 49 is a perspective view of the flip lock 36 with the blocker 122 and the flip lock spring 145, which biases the blocker 122, in place in the flip lock 36 and adjacent the blocker 122.

The ladder 10 may be a standard extension ladder having a fly section 20 and a base section 12. Alternatively, the ladder 10 may be a multipurpose ladder having a front section 140 and a rear section 142, as shown in FIG. 26 and FIG. 27 in an unextended step ladder configuration, or FIG. 48 in an extended step ladder configuration, or in FIGS. 45 and 46 in an unextended extension ladder configuration. As a multipurpose ladder, the front section may have J locks 144 for locking the fly section 20 and the base section 12 together at a desired length, and the rear section 142 having the lock assembly 28 described herein for locking the fly section 20 and the base section 12 of the rear section 142 at a desired length. If desired, the front section 140, instead of having J locks 144, may use the lock assembly 28 for locking the fly section 20 and base section 12 together.

As a multipurpose ladder 10, the front section 140 also has a base section 12 having a first base rail 14 and a second base rail 16 with base rungs 18 attached to them and disposed between them, as described above regarding the base section 12 and the fly section 20. The front section 140 also has a fly section 20 having a first fly rail 22 and a second fly rail 24 with fly rungs 26 attached to them and disposed between them, as described above regarding the base section 12 and the fly section 20. The base rungs 18 attached to the outside flanges of the first and second base rails, and the fly rungs 26 are attached to the inside of the web of the first and second fly rails so as not to interfere with the movement of the fly section 20 relative to the base section 12.

The first and second fly rails of the front section are attached with rivets or fasteners to a ladder top 146. Hinges 148 are attached by rivets or fasteners to the first and second fly rails of the front section adjacent the ladder top 146. The tops of the fly rails of the rear section 142 are attached to the hinges 148. The hinges 148 allow the rear section 142 to rotate relative to the front section 140. As shown in FIGS. 20 and 21, the rear section 142 has rotated about 180° relative to the front section 140 form the extension ladder position. In the extension ladder position, the first fly rail 22 of the rear section 142 and the second fly rail 24 of the rear section 142 fit into channels 150 in the ladder top 146 to allow the rear section 142 to align with the front section 140, although slightly offset due to the connection of the rear section fly rails being attached to the hinges 148.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A ladder comprising:

a base section including a first base rail and a second base rail in a spaced relationship with the first base rail and a plurality of base rungs attached to and extending between the first and second base rails;

a fly section including a first fly rail and a second fly rail in a spaced relationship with the first fly rail and a plurality of fly rungs attached to and extending between the first fly rail and the second fly rail, the fly section in sliding engagement with the base section; and a lock assembly including a base lock portion attached to the base section and a fly lock portion including a plunger and attached to the fly section, the fly lock portion engages and disengages with the base lock portion via movement of the plunger to lock the base section and the fly section relative to one another, wherein the base lock portion includes a socket disposed in one of a plurality of base rungs and the fly lock portion includes a flip lock with a flip axle disposed in one of the plurality of fly rungs and an extension portion that fits into the socket to secure the fly section to the base section and prevent inadvertent movement thereof when the fly and the base section are locked together.

2. The ladder of claim 1 wherein the extension portion includes a stem which fits into the socket to lock the fly section to the base section, an anchor from which the stem extends, the flip axle extending through the anchor about which the anchor including the stem rotates, and a flip spring which biases the stem into a stable position where the stem extends substantially perpendicular toward the first base rail from the first fly rail.

3. The ladder of claim 1 wherein the flip lock includes a locking recess into which the plunger selectively moves, such that when the plunger engages the recess the flip lock is prevented from rotating about its axis.

4. The ladder of claim 3 wherein the flip lock includes a blocker, and wherein, in a first state, the plunger engages the flip lock to prevent rotation of the flip lock, permitting the plunger to engage with the locking recess, and, in a second state, the plunger is prevented from engaging the flip lock and the locking recess by a location of the blocker.

5. The ladder of claim 1 wherein the lock assembly includes a lock lever engaged with the plunger and a lock lever handle connected to the lock lever, the lock lever handle movable from a down position to an up position by providing a force to the lock lever handle to move the plunger from a locking recess into which the plunger moves.

6. The ladder of claim 5 wherein the lock assembly includes a pulley mounted to the lock lever and a hoist rope which wraps around the pulley, the lock lever movable from a down position to an up position to move the plunger out from the locking recess by increasing tension on the hoist rope.

7. A ladder comprising:

a base section including a first base rail and a second base rail, the second base rail in a space relation to the first base rail;

a fly section including a first fly rail and a second fly rail, the second fly rail in a spaced relation to the first fly rail;

a plurality of base rungs attached to and extending between the first base rail and the second base rail;

a plurality of fly rungs attached to and extending between the first fly rail and the second fly rail; and a locking mechanism including a fly lock portion coupled to at least one of the plurality of fly rungs, a base lock portion coupled to at least one of the plurality of base rungs, wherein the fly lock portion includes a flip lock and a plunger, and wherein the locking mechanism, via the flip lock and the plunger engaging one another, prevents inadvertent unlocking and movement of the base section or the fly section relative to one another, and wherein the base lock portion includes a socket disposed within the at least one of the plurality of base rungs.

8. The ladder of claim 7, wherein the fly rail and base rail are locked to one another via the plunger engaging the flip lock and the flip lock engaging the socket.

9. The ladder of claim 7, wherein the socket includes a substantially flat top wall and a substantially rounded lower wall portion.

10. The ladder of claim 7, wherein the fly lock portion includes the flip lock coupled to the at least one of the plurality of fly rungs.

11. The ladder of claim 10, wherein the flip lock is coupled to the at least one of the plurality of fly rungs via an anchor and axle.

12. The ladder of claim 10, wherein the flip lock is coupled to the at least one of the plurality of fly rungs via a frame.

13. The ladder of claim 10, wherein the flip lock includes a substantially flat top surface, a substantially flat bottom surface, and an end surface, wherein at least a portion of the end surface is angled.

14. The ladder of claim 7, wherein the fly lock portion includes a blocker.

15. The ladder of claim 14, wherein the blocker selectively prevents the plunger from engaging the flip lock by movement of the blocker relative to the plunger.

16. The ladder of claim 7, wherein the flip lock includes a nose, and wherein the plunger engages the flip lock when the nose aligns with the socket, preventing inadvertent unlocking and movement of the base section or the fly section relative to one another.

17. A ladder comprising:

a base section including a first base rail and a second base rail, the second base rail in a space relation to the first base rail;

a fly section including a first fly rail and a second fly rail, the second fly rail in a spaced relation to the first fly rail;

a plurality of base rungs attached to and extending between the first base rail and the second base rail;

a plurality of fly rungs attached to and extending between the first fly rail and the second fly rail; and a locking mechanism including a fly lock portion coupled to at least one of the plurality of fly rungs, a base lock portion coupled to at least one of the plurality of base rungs, wherein the fly lock portion includes a flip lock and a plunger, and wherein the locking mechanism, via engagement between the flip lock and the plunger, prevents rotation of the flip lock, wherein the base lock portion includes a socket disposed within the at least one of the plurality of base rungs, wherein the fly section and base section are locked to one another via selective engagement of the flip lock and the socket while the plunger engages the flip lock.

18. The ladder of claim 17, wherein the fly lock portion includes the flip lock coupled to the at least one of the plurality of fly rungs.

19. A ladder comprising:

a base section including a first base rail and a second base rail, the second base rail in a space relation to the first base rail;

a fly section including a first fly rail and a second fly rail, the second fly rail in a spaced relation to the first fly rail;

a plurality of base rungs attached to and extending between the first base rail and the second base rail;

a plurality of fly rungs attached to and extending between the first fly rail and the second fly rail; and a locking mechanism including a fly lock portion coupled to at least one of the plurality of fly rungs, a base lock portion coupled to at least one of the plurality of base rungs, wherein the fly lock portion includes a flip lock and a plunger, and wherein the locking mechanism, via the flip lock and the plunger engaging one another prevents inadvertent unlocking and movement of the base section or the fly section relative to one another, wherein the fly lock portion includes a blocker and the blocker selectively prevents the plunger from engaging the flip lock.

20. The ladder of claim 19, wherein the fly lock portion includes the flip lock coupled to the at least one of the plurality of fly rungs.

* * * * *